(12) United States Patent
Saiidi

(10) Patent No.: US 9,677,274 B2
(45) Date of Patent: Jun. 13, 2017

(54) DECONSTRUCTABLE SUPPORT COLUMN STRUCTURES

(71) Applicant: Board of Regents of the Nevada System of Higher Education on behalf of the University of Nevada, Reno, Reno, NV (US)

(72) Inventor: Mehdi Saiidi, Reno, NV (US)

(73) Assignee: Board of Regents of the Nevada System of Higher Education on behalf of the University of Nevada, Reno, Reno, NV (US)

( * ) Notice: Subject to any disclaimer, the term of this patent is extended or adjusted under 35 U.S.C. 154(b) by 0 days.

(21) Appl. No.: 14/873,052

(22) Filed: Oct. 1, 2015

(65) Prior Publication Data
US 2016/0097199 A1    Apr. 7, 2016

Related U.S. Application Data

(60) Provisional application No. 62/059,064, filed on Oct. 2, 2014.

(51) Int. Cl.
| | | |
|---|---|---|
| *E04C 3/34* | (2006.01) | |
| *E02D 27/01* | (2006.01) | |
| *E02D 27/42* | (2006.01) | |
| *E04C 3/36* | (2006.01) | |
| *E01D 19/02* | (2006.01) | |

(52) U.S. Cl.
CPC .............. *E04C 3/34* (2013.01); *E02D 27/01* (2013.01); *E02D 27/42* (2013.01); *E01D 19/02* (2013.01); *E02D 2300/00* (2013.01); *E04C 3/36* (2013.01)

(58) Field of Classification Search
CPC ... E04C 3/34; E04C 3/36; E02D 27/01; E02D 27/42; E04H 12/34
USPC .............. 52/156, 126.7, 167.1, 167.2, 167.4, 52/167.7–167.9, 231, 292, 294–297, 52/834–835, 848, 849, 843–845
See application file for complete search history.

(56) References Cited

U.S. PATENT DOCUMENTS

| | | | | |
|---|---|---|---|---|
| 178,438 | A * | 6/1876 | Hill .................... | E02D 5/523 405/195.1 |
| 1,529,895 | A * | 3/1925 | La Chance ............ | E02D 27/42 52/223.5 |

(Continued)

OTHER PUBLICATIONS

International Search Report and Written Opinion dated Jan. 9, 2017, issued by the Korean Intellectual Property Office in Patent Cooperation Treaty Application Serial No. PCT/US2016/055155, filed Oct. 3, 2016.

*Primary Examiner* — Brian Glessner
*Assistant Examiner* — Omar Hijaz
(74) *Attorney, Agent, or Firm* — Klarquist Sparkman, LLP

(57) ABSTRACT

Disclosed herein are support column structures which can be used to support bridges, buildings or other structures. In some cases, a support column structure can be deconstructable and include one or more removable elements. In some cases, a support column structure can include shape memory alloy reinforcing bars. In some cases, a removable element of a support column structure can include an engineered cementitious composite. In some cases, a removable element includes one or more sleeves to separate an engineered cementitious composite from one or more shape memory alloy reinforcing bars. Methods include assembling and disassembling a support column structure.

19 Claims, 20 Drawing Sheets

(56) References Cited

U.S. PATENT DOCUMENTS

| | | | | |
|---|---|---|---|---|
| 2,948,995 A * | 8/1960 | Cogan | E04B 1/21 | 264/228 |
| 3,245,646 A * | 4/1966 | Baratoff | F16F 3/0873 | 248/568 |
| 4,024,688 A * | 5/1977 | Calini | E04C 5/165 | 403/310 |
| 4,306,397 A * | 12/1981 | Ramseyer | G21C 19/07 | 250/506.1 |
| 4,633,628 A * | 1/1987 | Mostaghel | E02D 27/34 | 52/167.7 |
| 4,731,966 A * | 3/1988 | Fujita | E04B 1/98 | 248/618 |
| 4,910,940 A * | 3/1990 | Grady, II | E04B 1/18 | 52/223.5 |
| 5,218,805 A * | 6/1993 | Rex | E02D 27/42 | 256/24 |
| 5,379,563 A * | 1/1995 | Tinsley | E02D 27/44 | 248/679 |
| 5,611,974 A * | 3/1997 | Welch | B29C 67/243 | 264/34 |
| 7,618,217 B2 * | 11/2009 | Henderson | E04H 12/085 | 405/239 |
| 7,827,748 B2 * | 11/2010 | Brown | E02D 27/42 | 52/169.9 |
| 8,776,463 B2 * | 7/2014 | Kim | F03D 11/00 | 52/295 |
| 8,826,629 B1 * | 9/2014 | Brindle | E04C 3/005 | 52/126.7 |
| 2003/0021636 A1 * | 1/2003 | Silber | E02D 27/42 | 405/229 |
| 2009/0126288 A1 * | 5/2009 | Fanucci | F16F 15/04 | 52/167.1 |
| 2013/0255169 A1 * | 10/2013 | Henderson | E04C 5/125 | 52/223.13 |
| 2015/0020467 A1 * | 1/2015 | Fern ndez Falces | E04F 17/08 | 52/220.1 |
| 2015/0113913 A1 * | 4/2015 | Kim | E04C 3/34 | 52/834 |
| 2016/0047137 A1 * | 2/2016 | Aagerup | E02D 27/12 | 248/530 |
| 2016/0097205 A1 * | 4/2016 | Ohshima | E04B 5/43 | 52/167.1 |

\* cited by examiner

DECONSTRUCTABLE SUPPORT COLUMN STRUCTURES

CROSS REFERENCE TO RELATED APPLICATION

This application claims the benefit of U.S. Provisional Application Ser. No. 62/059,064, entitled DECONSTRUCTABLE SUPPORT COLUMN STRUCTURES, filed on Oct. 2, 2014, which application is incorporated by reference herein.

ACKNOWLEDGMENT OF GOVERNMENT SUPPORT

This invention was made with government support under grant no. IIP-1114406 awarded by the National Science Foundation. The government has certain rights in the invention.

FIELD

The present disclosure relates generally to support columns, and more particularly to interchangeable and replaceable components for use in bridge support columns.

BACKGROUND

When reinforced concrete structures reach the end of their useful life (e.g., when they are damaged beyond repair, no longer meet safety or serviceability standards, etc.), the entire structure is often demolished and sent to a dump, to be replaced, if at all, by a completely new structure. This is often the case even in situations where, for example, a single component or a small set of components have reached the end of their useful life, though the rest of the structure has not. Methods, systems, and devices that increase the useful life of reinforced concrete structures, such as by reducing the occurrence of failures and/or by facilitating the replacement of individual structural components rather than an entire structure, are thus advantageous.

SUMMARY

The present disclosure relates generally to support columns, and more particularly to interchangeable and replaceable components for use in bridge support columns.

In some embodiments, a support column structure comprises a base portion having a top surface, a column portion having a bottom surface, and a removable portion comprising an engineered cementitious composite. The removable portion further comprises a top surface removably coupled to the bottom surface of the column portion and a bottom surface removably coupled to the top surface of the base portion.

In some embodiments, the removable portion further comprising a main body portion and a plurality of sleeves. The support column structure further comprises a plurality of reinforcing bars extending from the bottom surface of the column portion, through a respective sleeve of the removable portion, to the top surface of the base portion. The sleeves separate the respective reinforcing bars from the main body portion of the removable portion such that the reinforcing bars are not in contact with the main body portion of the removable portion.

In some embodiments, the removable portion further comprises a top plate removably coupled to the bottom surface of the column portion and a bottom plate removably coupled to the top surface of the base portion, and the engineered cementitious composite is situated between the top plate and the bottom plate. In some embodiments, the column portion further comprises a plurality of reinforcing bars, the top plate comprises a plurality of openings, each of the reinforcing bars of the column portion extend through a respective opening of the top plate, and a nut is situated on a bottom end portion of each of the reinforcing bars, thereby removably coupling the top plate to the bottom surface of the column portion. In some embodiments, the removable portion further comprises a central longitudinal pipe extending from above a top surface of the top plate, through the top plate, through the engineered cementitious composite, through the bottom plate, to below a bottom surface of the bottom plate. In some embodiments, the support column structure further comprises a plurality of shape memory alloy reinforcing bars.

In some embodiments, a support column structure comprises a base portion having a top portion, a column portion having a bottom portion, a removable portion comprising a main body portion and a plurality of sleeves, and a plurality of reinforcing bars. Each of the reinforcing bars extends from the bottom portion of the column portion, through a respective sleeve of the removable portion, to the top portion of the base portion, and the sleeves separate the respective reinforcing bars from the main body portion of the removable portion such that the reinforcing bars are not in contact with the main body portion of the removable portion. In some embodiments, the sleeves structurally separate the reinforcing bars from the main body portion such that forces cannot be directly transferred between the reinforcing bars and the main body portion. In some embodiments, the main body portion of the removable portion comprises an engineered cementitious composite.

In some embodiments, the removable portion further comprises a top surface removably coupled to the bottom portion of the column portion, and a bottom surface removably coupled to the top portion of the base portion. In some embodiments, the base portion further comprises a plurality of coupling elements situated within the top portion of the base portion having respective annular top portions with inner threads formed therein, each of the reinforcing bars having respective bottom portions with outer threads formed therein, and the bottom portion of each reinforcing bar is threaded into a respective one of the coupling elements.

In some embodiments, a method of assembling a support column structure comprises positioning a base portion to act as a foundation for the support column structure, coupling a plurality of reinforcing bars to the base portion, situating a removable element on the base portion such that the reinforcing bars extend through a main body of the removable element, the main body comprising an engineered cementitious composite, coupling the reinforcing bars to the removable element such that the removable element is restrained against movement with respect to the base portion, situating a column portion on the removable element, and coupling the column portion to the removable element such that the column portion is restrained against movement with respect to the removable portion. In some embodiments, the reinforcing bars comprise a shape memory alloy. In some embodiments, coupling a plurality of reinforcing bars to the base portion comprises threading each of the reinforcing bars into a respective coupling element of the base portion. In some embodiments, coupling the reinforcing bars to the removable element comprises threading a nut onto a top end portion of each of the reinforcing bars.

In some embodiments, situating the column portion on the removable element comprises allowing a plurality of reinforcement elements of the column portion to pass through respective openings in a top portion of the removable element and coupling the column portion to the removable element comprises threading a nut onto a bottom end portion of each of the reinforcement elements of the column portion.

In some embodiments, a method of disassembling a support column structure comprising a base portion, a removable portion, a column portion, and a plurality of shape memory alloy reinforcing bars, comprises de-coupling the column portion from the removable portion, lifting the column portion off the removable portion, de-coupling the removable portion from the plurality of shape memory alloy reinforcing bars, the shape memory alloy reinforcing bars being coupled to the base portion, and lifting the removable portion off the base portion. In some embodiments, de-coupling the column portion from the removable portion comprises removing nuts from bottom end portions of reinforcing elements of the column portion. In some embodiments, de-coupling the removable portion from the plurality of shape memory alloy reinforcing bars comprises removing nuts from top end portions of the shape memory alloy reinforcing bars. In some embodiments, lifting the column portion off the removable portion comprises lifting any structure supported by the support column structure off the removable portion.

In some embodiments, a support column structure comprises a base portion having a top surface, a head portion having a bottom surface, and a removable portion comprising a top plate, a bottom plate, and an engineered cementitious composite situated between the top plate and the bottom plate. The base portion further comprises a plurality of reinforcing bars fixedly secured to the top surface which extend from the top surface of the base portion, through the bottom plate and the engineering cementitious composite, and are removably coupled to the top plate. The removable portion further comprises a plurality of reinforcing elements removably coupled to the bottom plate which extend to the head portion, without contacting the engineering cementitious composite or the top plate, and are removably coupled to the head portion. In some embodiments, the reinforcing elements can comprise shape memory alloys.

The foregoing and other objects, features, and advantages of the invention will become more apparent from the following detailed description, which proceeds with reference to the accompanying figures.

DETAILED DESCRIPTION

Figure 1:
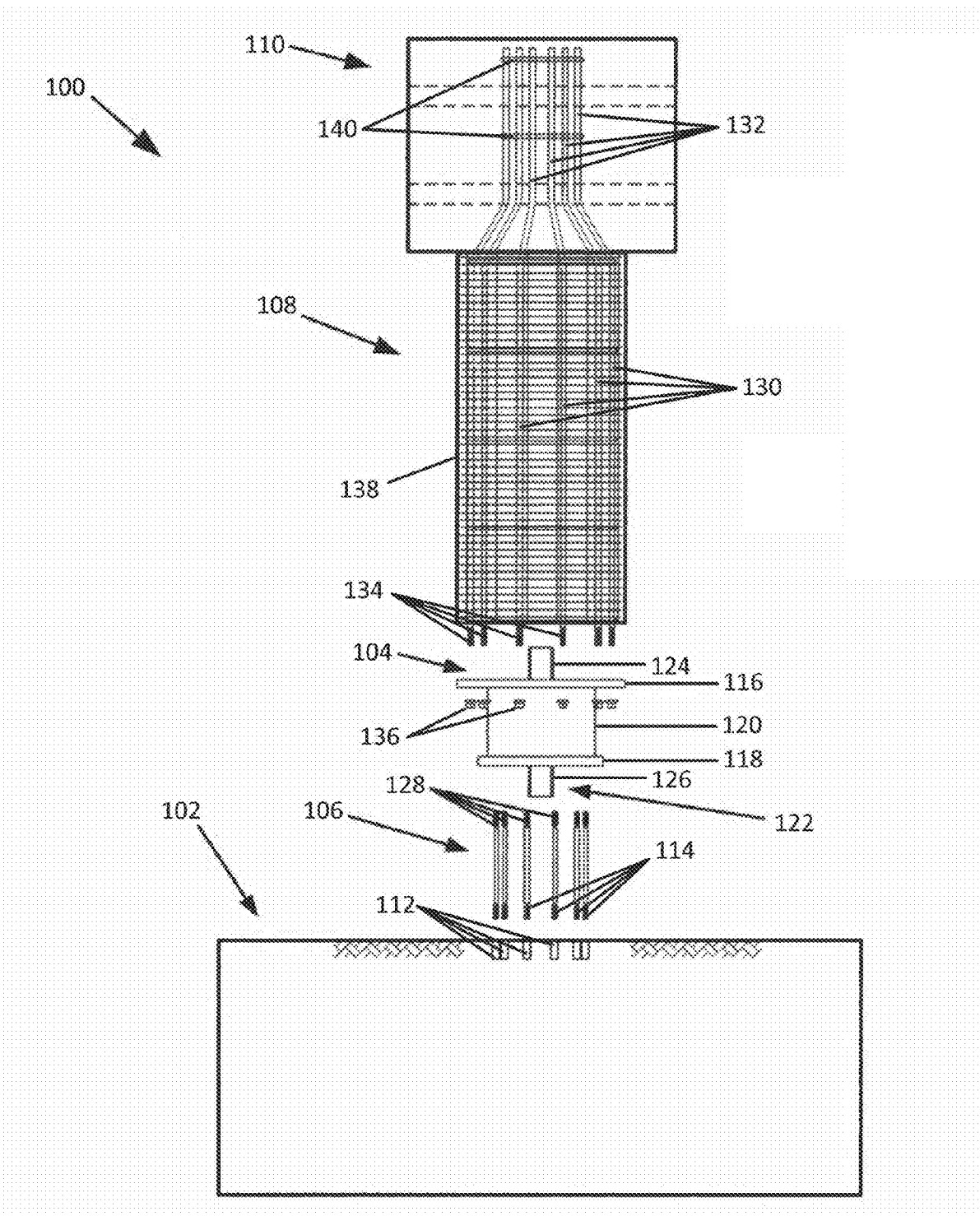
FIG. 1 is an exploded elevation view of several components of a support column structure, according to one embodiment.

Bridges and other structures are often fabricated using steel and/or reinforced concrete ("RC") structural components, including steel and/or reinforced concrete support columns. Concrete is known to have relatively high compression strength, making it particularly suitable for use in support columns, but relatively low tensile strength and ductility. Accordingly, structural concrete often incorporates reinforcement having higher tensile strength and ductility than concrete, with steel reinforcing bars ("rebar") being a particularly well-suited reinforcing material.

The production of cement for use in reinforced concrete structures is known to be a highly greenhouse gas intensive process. In particular, it has been estimated that cement production is responsible for approximately five percent of global greenhouse gas emissions. When reinforced concrete structures reach the end of their useful life, those structures are often demolished and replaced by completely new structures. This is often the case even in situations where only a portion of the structure has reached the end of its useful life. Methods, systems, and devices that facilitate the replacement of individual structural components rather than an entire structure are thus advantageous. Such methods, systems, and devices can reduce the cost of maintenance, repair, replacement, salvage, and reuse of structural components, and thus can reduce greenhouse gas emissions caused by the repair and maintenance of reinforced concrete structures such as bridges. For example, when one component of a larger structure is damaged, it can be replaced with another component without requiring replacement of the entire structure.

Further, methods, systems, and devices capable of concentrating loads in specific locations of a structure during extreme loading events can help to reduce the extent of damage caused by the extreme loading event to the rest of the structure. In some cases, a component at such a location can be designed to attract and dissipate the concentrated loads, for example, by undergoing extreme, irreversible, and/or hysteretic deformations. Such a component can be referred to as a sacrificial component, and can be designed to be replaceable. Thus, such components can both greatly reduce the overall damage caused by extreme loading events, and greatly reduce the cost (in terms of dollars and/or greenhouse gas emissions) of repairing that damage.

Standard concrete is typically produced using water, aggregate, and cement. When these components are mixed, the water and cement begin to chemically react with one another by a process of hydration to form a solid and rigid matrix where cement binds the aggregate together. Finished reinforced structural concrete can thus be made up of three component parts: rebar (or other suitable reinforcing material), aggregate, and cement binding the rebar and aggregate together. The most common type of cement used in the fabrication of structural concrete is Portland cement, and concrete fabricated using Portland cement often has a tensile strain capacity in the range of 0.02%.

Engineered cementitious composites ("ECC," sometimes referred to as "bendable concrete") are a broad group of cementitious materials designed to have a much higher strain capacity and ductility than standard concrete. For example, ECC can have a compressive strength in the range of 5 ksi-9 ksi and a tensile strain capacity in the range of 3-7%. ECC can be mortar-based and reinforced with short fibers (e.g., short polymeric fibers) randomly distributed throughout the material. For example, ECC can comprise cement, fly ash, sand, polyvinyl fibers, super-plasticizers, admixtures, and water. In some cases, ECC can comprise Type I/II cement; fly ash, such as Type F with a low loss on ignition ("LOT") factor; silica aggregate with an average mesh factor between #50 and #90; fine silica powder with a mesh factor exceeding #200; polyvinyl alcohol fibers with a dosage of 1.5-2.0% (by volume); high range water reducer, which may be a hyroxypropylmethylcellulose formulation; and super-plasticizer, which may be a polycarboxylate ether formulation and/or other ingredients to achieve minimal water content and other desired results. In some cases, fly ash substitution can be in the range of 33-60% by mass. In some cases, ECC can be fabricated without aggregate, or can be fabricated without coarse aggregate. An example of a commercially available ECC is Tensal Resilient Concrete as produced by FiberMatrix, Inc.

As an alternative to ECC, elastomeric components such as rubber components can be incorporated into structures. ECC and/or elastomeric components can be highly deformable with respect to other structural components, such as those fabricated from steel and/or concrete.

Shape memory alloys ("SMA") are a group of materials capable of undergoing extreme deformations, including plastic deformations, and returning to a preset original shape, such as when heated or when stress is removed. In some cases, SMAs can hold up to 8% strain and fully recover to the preset original shape, compared to about 0.2% for conventional steels. A variety of SMAs are known, with three groups being copper-aluminum-nickel SMAs, nickel-titanium ("NiTi" or "Nitinol") SMAs, and Cu—Al—Mn copper-based SMAs (referred to herein as "Cu-SMAs"), which have been found to be easier and less expensive to fabricate than some other SMAs.

FIGS. 1-7 illustrate components of a support column structure 100. FIG. 1 illustrates an exploded view of many of these components. Structure 100 includes a base portion 102, a removable element 104, a plurality of SMA bars 106, a column portion 108, and a head portion 110. Base portion 102 can comprise a foundation or footing for the structure 100, and can comprise various materials, with reinforced concrete being one example. The base portion 102 can comprise a pre-cast or a cast-in-place reinforced concrete footing, and can include a plurality of coupling elements 112 configured to receive lower end portions 114 of the SMA bars 106.

The removable element 104 can include a top plate 116, a bottom plate 118, a main body portion 120, and a central tube 122. The top plate 116, bottom plate 118, and main body portion 120 can include a plurality of openings configured to receive the central tube 122 and SMA bars 106. Thus, the tube 122 can extend from a top portion 124 of the tube 122, through the top plate 116, through the main body portion 120, through the bottom plate 118, to a bottom portion 126 of the tube 122. Similarly, the SMA bars 106 can extend from respective top portions 128 of the SMA bars 106, through the top plate 116, through the main body portion 120, through the bottom plate 118, to the respective bottom portions 114 of the SMA bars 106.

The column portion 108 can comprise a reinforced concrete column including a plurality of steel reinforcing bars 130, which can extend from top portions 132 of the reinforcing bars 130, which can be situated within the head portion 110, through the column portion 108, to bottom portions 134 of the reinforcing bars 130. The top plate 116 of the removable element 104 can include a plurality of openings such that the bottom portions 134 of the reinforcing bars 130 can extend through the top plate 116 and be coupled thereto by a plurality of fastening elements 136 (e.g., nuts). In some cases, the column portion 108 can be surrounded by or jacketed with a fiber reinforcing polymer ("FRP") 138 such as a carbon fiber reinforcing polymer ("CFRP") or a glass fiber reinforcing polymer ("GFRP").

The head portion 110 can comprise a reinforced concrete block. The concrete of the head portion 110 can be integrally formed with the concrete of the column portion 108. For example, the concrete of the head portion 110 and of the column portion 108 can be formed from a single batch of concrete. Alternatively, the concrete of the head portion 110 and of the column portion 108 need not be integrally formed with one another. The head portion 110 can comprise the top portions 132 of the reinforcing bars 130, as well as additional reinforcing bars 140. The head portion 110 can comprise a portion of a larger structural component, such as a beam, girder, or bent cap. Alternatively, the head portion 110 can comprise a stand-alone element to which other structural components, such as a beam, girder, or bent cap, can be coupled.

Figure 2:
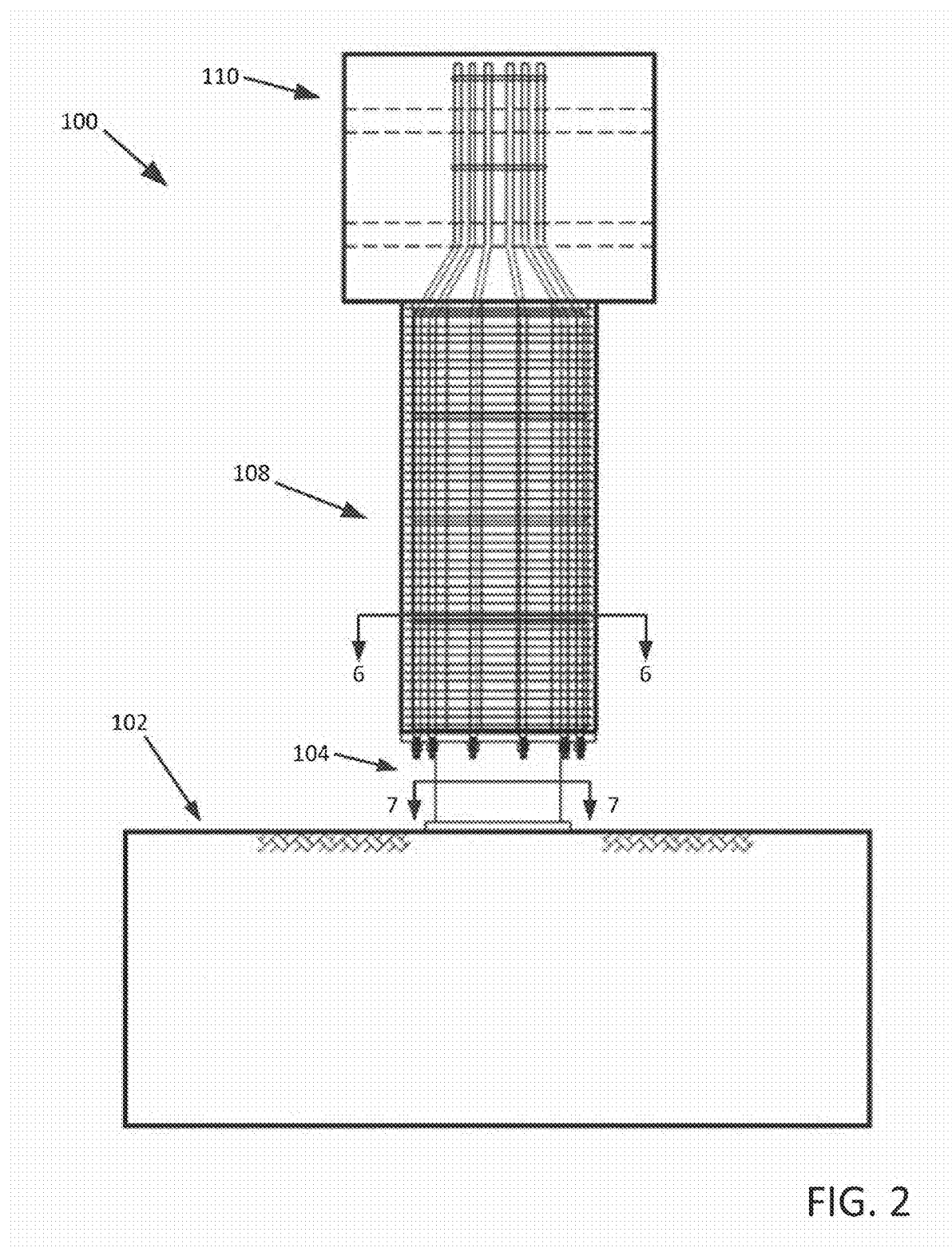
FIG. 2 is an elevation view of components of the support column structure of FIG. 1 in an assembled configuration.
Figure 3:
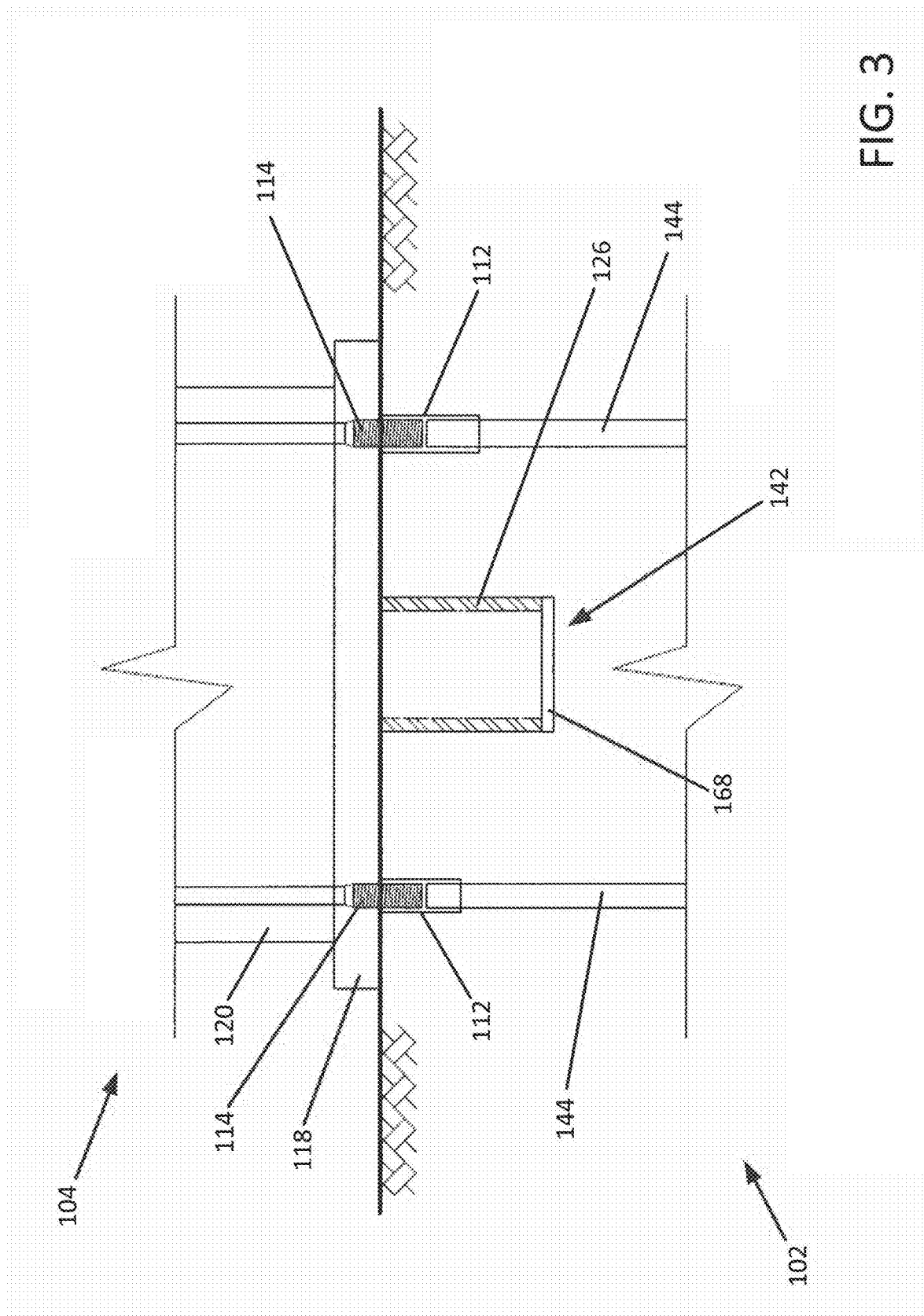
FIG. 3 is a schematic view of connection elements of a removable element and a base portion of the support column structure of FIG. 1.
Figure 4:
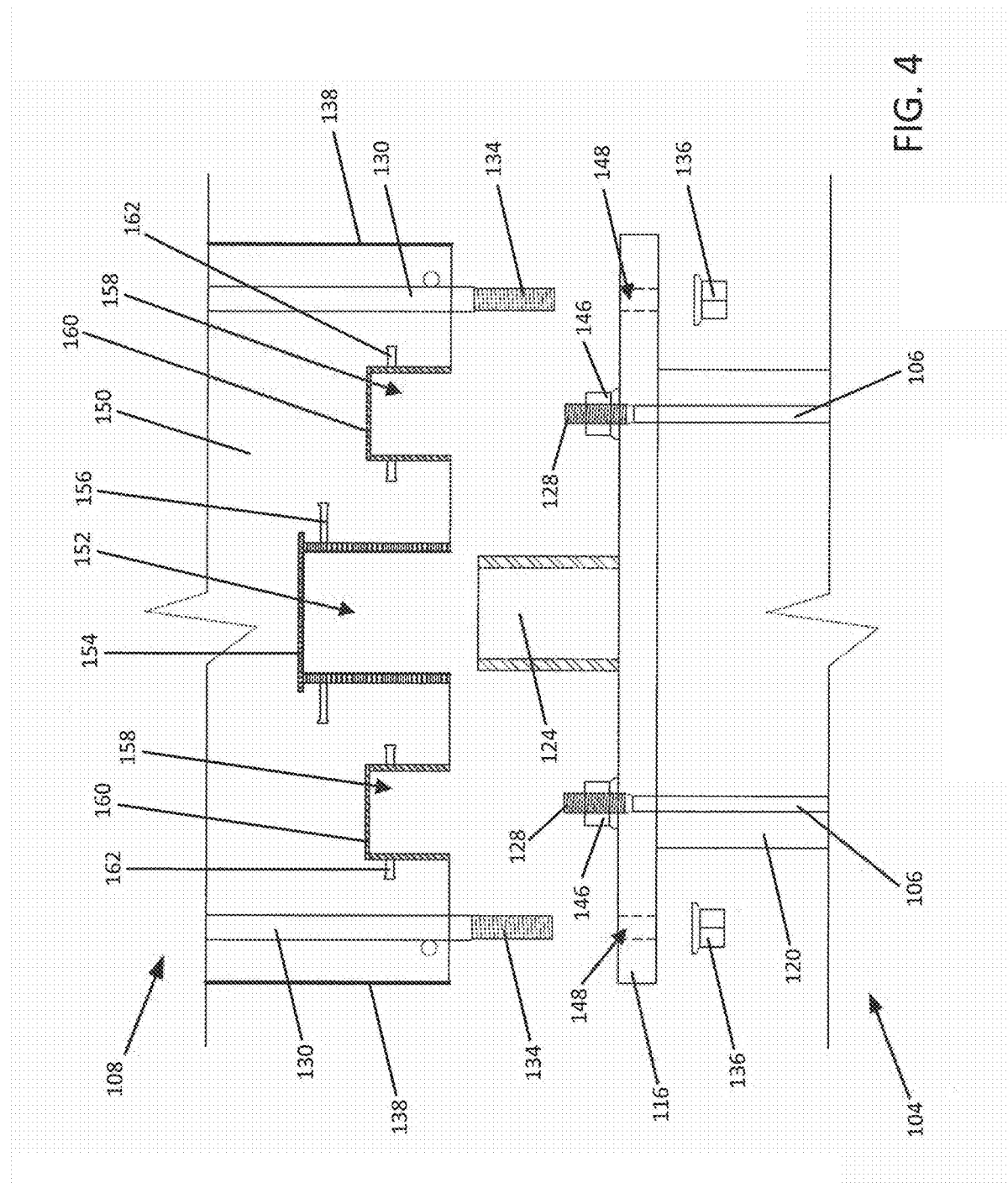
FIG. 4 is a schematic view of connection elements of the removable element and a column portion of the support column structure of FIG. 1.

FIG. 2 illustrates the base portion 102, removable element 104, column portion 108, and head portion 110 of the structure 100 in an assembled configuration. FIG. 3 illustrates connection elements of the removable element 104 and the base portion 102, in an assembled configuration. FIG. 4 illustrates connection elements of the removable element 104 and column portion 108, in a disassembled configuration.

As shown in FIG. 3, the base portion 102 can include a recess 142 configured to receive the bottom portion 126 of the tube 122. The recess 142 can have a diameter slightly larger than a diameter of the bottom portion 126 such that the bottom portion 126 fits snugly within the recess 142 when situated therein. In some cases, a diameter of the recess 142 can be greater than a diameter of the bottom portion 126 by less than 20 mm, or by less than 10 mm, or by less than 5 mm, or by less than 2 mm, or by less than 1 mm. The recess 142 can have a length which is longer than a length of the bottom portion 126 such that a space 168 is disposed between the bottom portion 126 and the bottom of the recess 142. The base portion 102 can also include a plurality of reinforcing elements 144 embedded within concrete of the base portion 102 and coupled to the respective coupling elements 112. For example, the reinforcing elements 144 can be integrally formed with or welded to the respective coupling elements 112.

The coupling elements 112 can comprise annular members having internal threads on an interior surface of the coupling elements 112. In some cases, the portions of the reinforcing elements 144 coupled to the coupling elements 112 can have external threads complementing the internal threads of the coupling elements 112, and the reinforcing elements 144 can be threaded into the coupling elements 112. Further, the bottom portions 114 of the SMA bars 106 can have external threads complementing the internal threads of the coupling elements 112, and the bottom portions 114 can be threaded into the coupling elements 112. Thus, the coupling elements 112 can couple the SMA bars 106 to the reinforcing elements 144.

As shown in FIG. 4, the top portions 128 of the SMA bars 106 can be coupled to the top plate 116 by a plurality of fasteners or nuts 146. In some cases, the top portions 128 of the SMA bars 106 can have external threads complementing internal threads of the nuts 146, and the nuts 146 can be threaded onto the top portions 128 of the SMA bars 106 to secure the SMA bars 106 to the top plate 116. In some cases, the nuts 146 can be threaded onto the top portions 128 of the SMA bars 106 to induce tension in the SMA bars 106 and to maintain the SMA bars 106 in a state of tension.

In some cases, the nuts 146 can be threaded onto the top portions 128 to induce tension in the SMA bars 106 such that when the removable element 104 experiences compression, such as from the weight of the column portion 108, head portion 110, and any structure supported thereon, and/or in response to any loading events, the SMA bars 106 remain in tension. In some cases, the nuts 146 secure the SMA bars 106 to the top plate 116 such that the top portions 128 of the SMA bars 106 cannot move toward the main body portion 120 but such that the top portions 128 can move away from the main body portion 120. Thus, the SMA bars 106 can be coupled to the other components of the removable element 104 such that the SMA bars do not experience compression.

As also shown in FIG. 4, the top plate 116 can include a plurality of openings 148 configured to receive the bottom portions 134 of the reinforcing bars 130. In some cases, the bottom portions 134 of the reinforcing bars 130 can extend through the openings 148 in the top plate 116 and the fastening elements 136 can be fastened to the bottom portions 134 of the reinforcing bars 130 so as to secure the reinforcing bars 130 to the top plate 116. In some cases, the fastening elements 136, which can be nuts, can be threaded onto the bottom portions 134 of the reinforcing elements 130 to induce tension in the reinforcing elements 130 and to maintain the reinforcing elements 130 in a state of tension, thereby post-tensioning the reinforcing elements 130.

As also shown in FIG. 4, the column portion 108 can comprise a reinforced concrete material 150, a central tube-receiving recess 152, and a plurality of SMA bar receiving recesses 158. The recesses 152, 158 can be formed by casting the concrete material 150 around respective cups 154, 160, each of which can be coupled to respective securing elements 156, 162, which can secure the cups 154, 160 within the concrete material 150 when the concrete material 150 is cured. The recess 152 can be configured to receive the top portion 124 of the tube 122. The recess 152 can have a diameter slightly larger than a diameter of the top portion 124 such that the top portion 124 fits snugly within the recess 152 when situated therein. In some cases, a diameter of the recess 152 can be greater than a diameter of the top portion 124 by less than 20 mm, or by less than 10 mm, or by less than 5 mm, or by less than 2 mm, or by less than 1 mm. The recess 152 can have a length which is longer than a length of the top portion 124 such that a space is disposed between the top portion 124 and the top of the recess 152 when the top portion 124 is disposed within the recess 152.

The recesses 158 can be situated and configured to receive the top portions 128 of respective SMA bars 106 and respective nuts 146. The recesses 158 can be substantially larger than the top portions 128 of the SMA bars 106 and nuts 146 such that as these components move when the structure 100 is loaded in various ways, the top portions 128 of the SMA bars 106 and the nuts 146 do not contact the respective cups 160. In some cases, the cups 160 can be configured such that a gap of at least 1 mm, or at least 2 mm, or at least 5 mm, or at least 10 mm, or at least 20 mm, or at least 50 mm exists between the cups 160 and the respective top portions 128 of the SMA bars 106 and the nuts 146.

Figure 5:
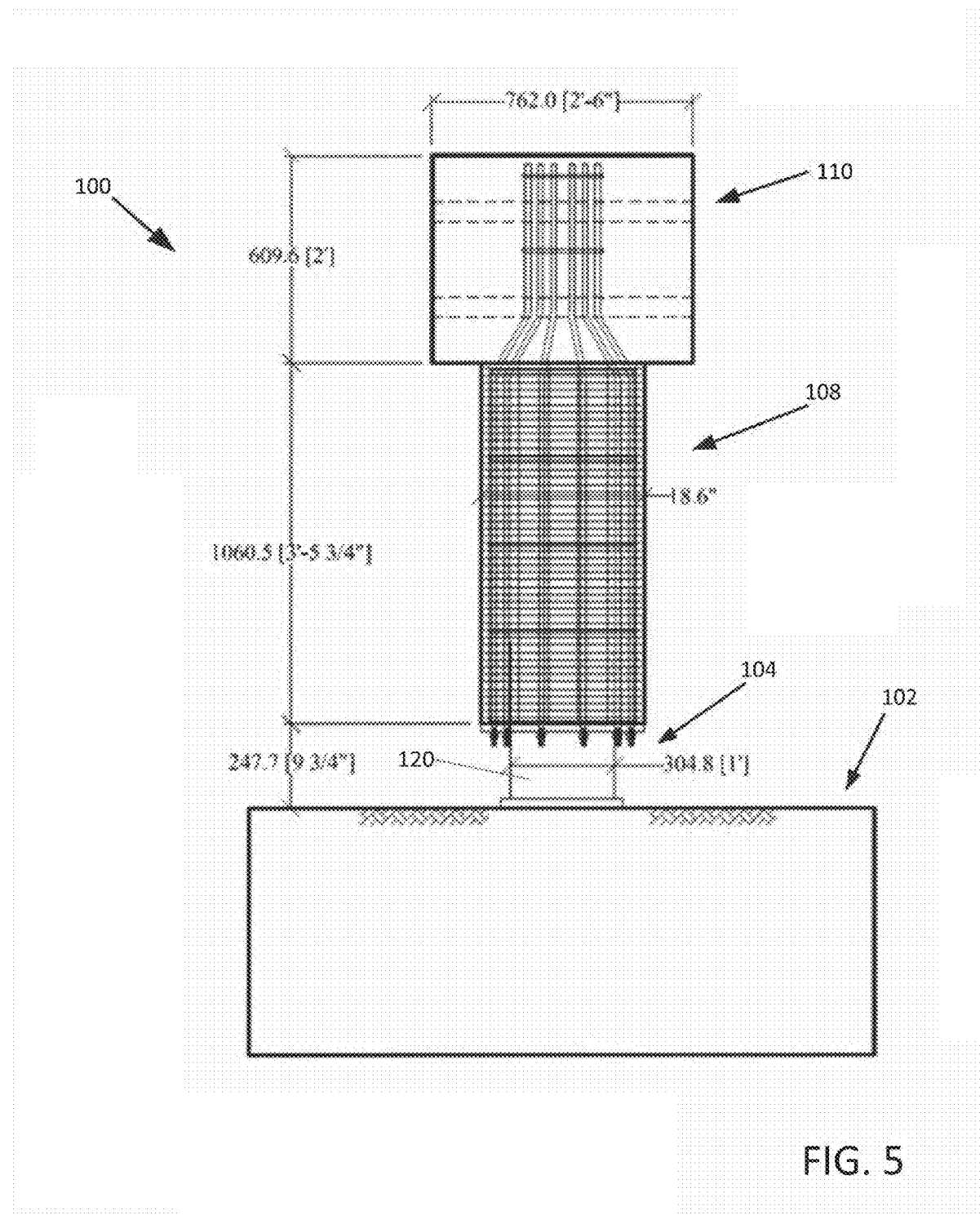
FIG. 5 illustrates some possible dimensions of components of the support column structure of FIG. 1.
Figure 6:
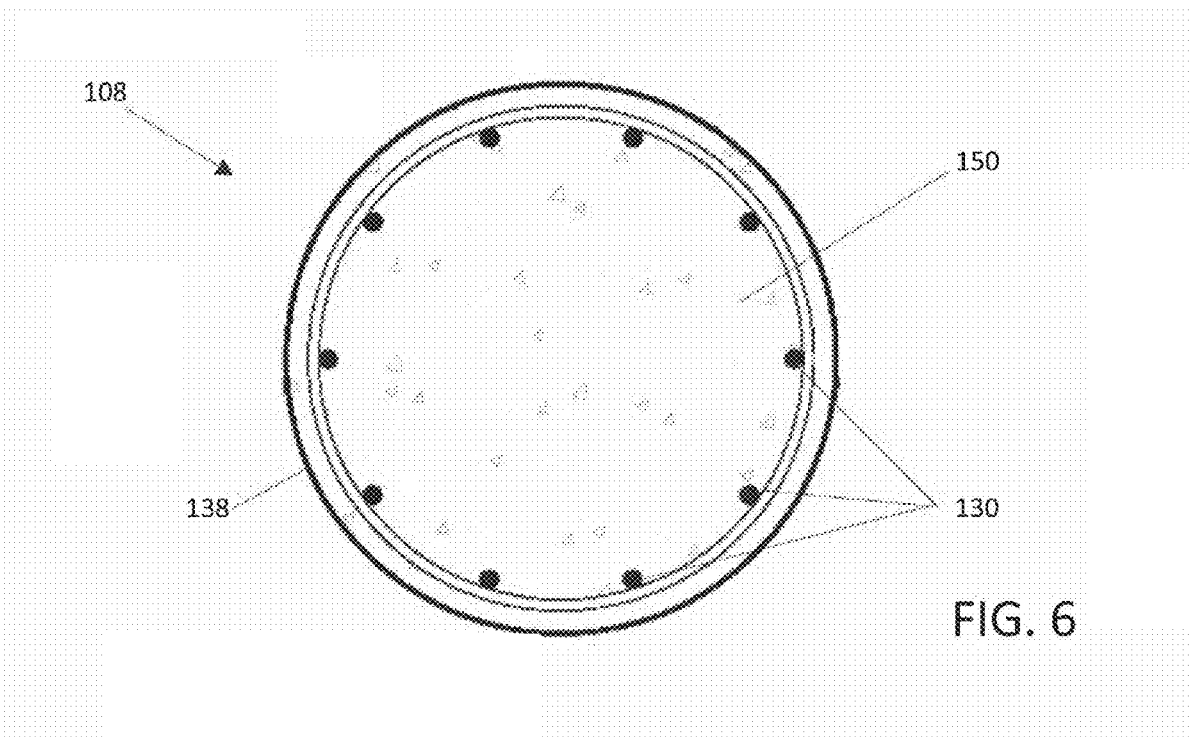
FIG. 6 illustrates a cross-sectional view of the column portion of the support column structure of FIG. 1.
Figure 7:
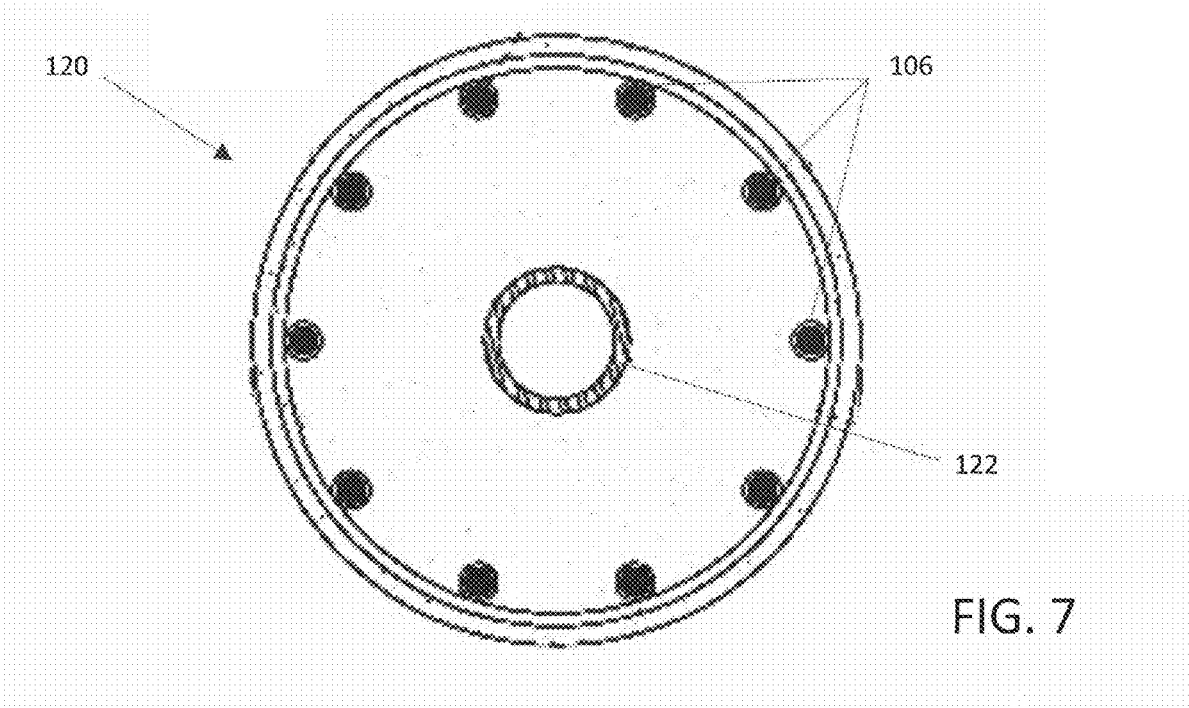
FIG. 7 illustrates a cross-sectional view of the removable element of the support column structure of FIG. 1.

FIG. 5 illustrates some possible dimensions of components of the structure 100. For example, the main body portion 120 of the removable element 104 can have a diameter of 1' or 304.8 mm and the removable element 104 can have a height of 9¾" or 247.7 mm. The column portion 108 can have a diameter of about 18.6" or 472.4 mm and a height of 3' 5¾" or 1060.5 mm. The head portion 110 can have a width of 2' 6" or 762.0 mm, and a height of 2' or 609.6 mm. FIG. 6 illustrates a cross-sectional view of the column portion 108 taken along section 6-6 shown in FIG. 2. FIG. 7 illustrates a cross-sectional view of the main body portion 120 of the removable element 104 taken along section 7-7 shown in FIG. 2.

It should be noted that, although some exemplary dimensions are provided herein, the components of the structures disclosed herein (e.g., the components of structures 100, 200, 300) can comprises other dimensions and can be scaled for various applications.

Figure 8:
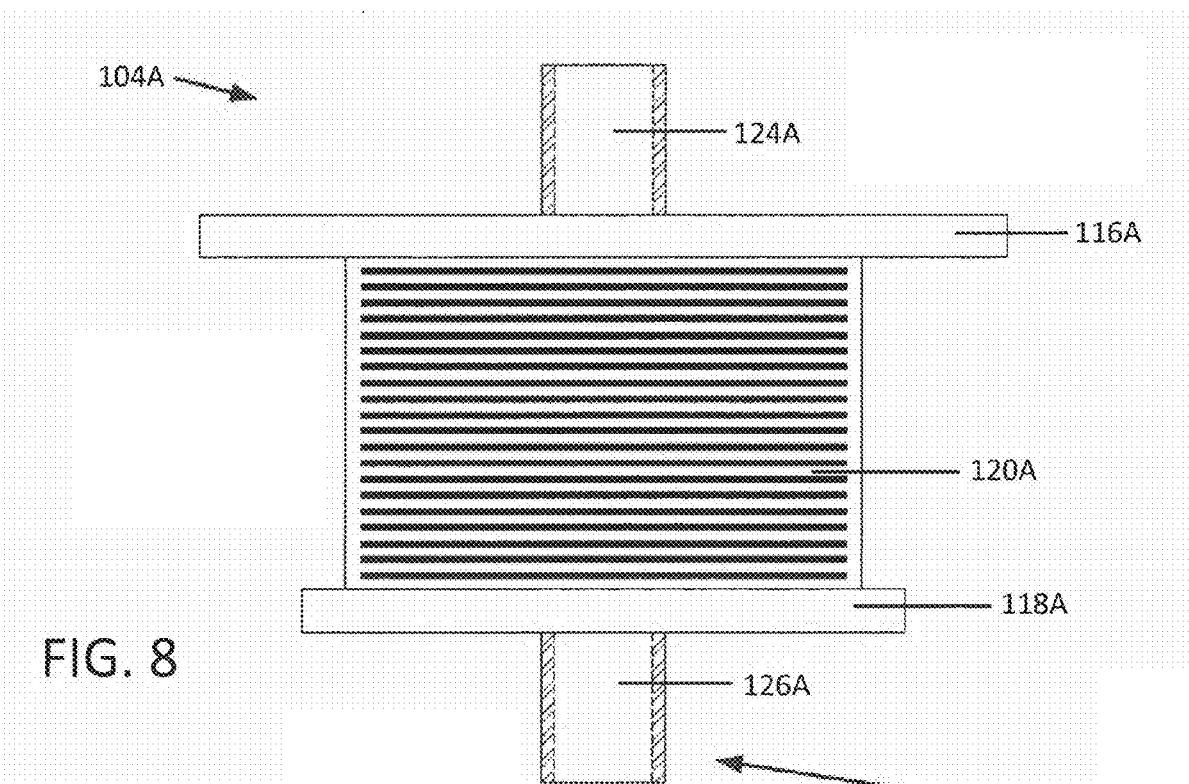
FIG. 8 illustrates a removable element which can be used in the support column structure of FIG. 1.
Figure 9:
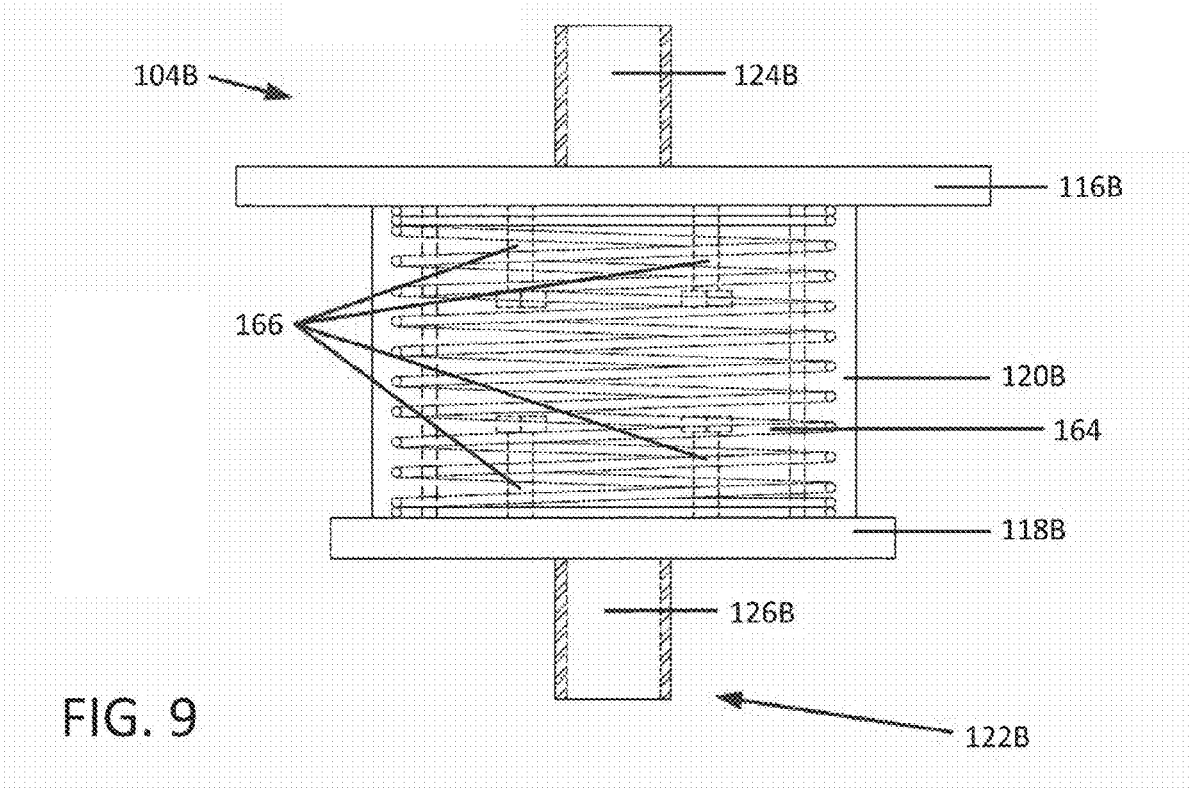
FIG. 9 illustrates another removable element which can be used in the support column structure of FIG. 1.

FIG. 8 illustrates a removable element 104A which can be used as the removable element 104 of structure 100. Removable element 104A can include a top plate 116A, a bottom plate 118A, a main body portion 120A, and a central tube 122A having a top portion 124A and a bottom portion 126A. The main body portion 120A can comprise an elastomeric, e.g., a rubber material. FIG. 9 illustrates a removable element 104B which can be used as the removable element 104 of structure 100. Removable element 104B can include a top plate 116B, a bottom plate 118B, a main body portion 120B, and a central tube 122B having a top portion 124B and a bottom portion 126B. The main body portion 120B can comprise an ECC material and one or more internal reinforcing elements 164. The top plate 116B and bottom plate 118B can each be coupled to one or more respective securing elements 166 which can secure the top and bottom plates 116B, 118B to the ECC material of the main body portion 120B when the ECC material is cured.

Figure 10:
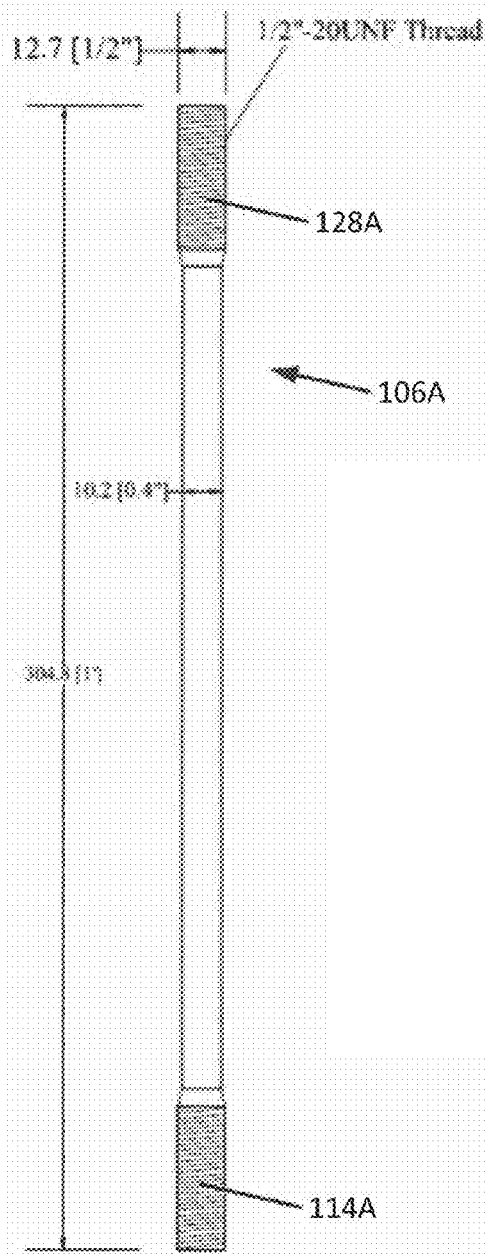
FIG. 10 illustrates an SMA bar which can be used in the support column structure of FIG. 1.
Figure 11:
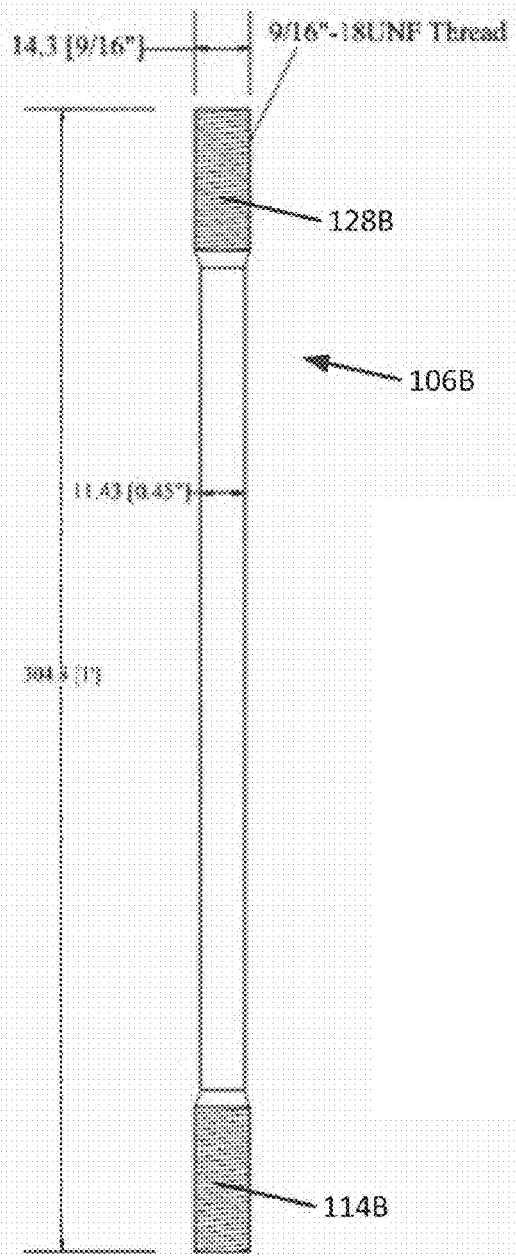
FIG. 11 illustrates another SMA bar which can be used in the support column structure of FIG. 1.

FIG. 10 illustrates an SMA bar 106A which can be used as an SMA bar 106 of structure 100. SMA bar 106A has a top portion 128A and a bottom portion 114A, and comprises a Nitinol material. The top portion 128A and bottom portion 114A can each have a diameter of about ½" or 12.7 mm, and can be threaded with 20UNF threads. An intermediate portion of the SMA bar 106A between the top portion 128A and the bottom portion 114A can have a diameter of about 0.4" or 10.2 mm, and the bar 106A can have an overall length of about 1' or 304.8 mm. FIG. 11 illustrates an SMA bar 106B which can be used as an SMA bar 106 of structure 100. SMA bar 106B has a top portion 128B and a bottom portion 114B, and comprises a Cu-SMA material. The top portion 128B and bottom portion 114B can each have a diameter of about 9/16" or 14.3 mm, and can be threaded with 18UNF threads. An intermediate portion of the SMA bar 106B between the top portion 128B and the bottom portion 114B can have a diameter of about 0.45" or 11.43 mm, and the bar 106B can have an overall length of about 1' or 304.8 mm.

In some cases, structure 100 can include removable element 104A as removable element 104 and SMA bars 106A as SMA bars 106. In some cases, structure 100 can include removable element 104A as removable element 104 and SMA bars 106B as SMA bars 106. In some cases, structure 100 can include removable element 104B as removable element 104 and SMA bars 106A as SMA bars 106. In some cases, structure 100 can include removable element 104B as removable element 104 and SMA bars 106B as SMA bars 106.

Figure 12:
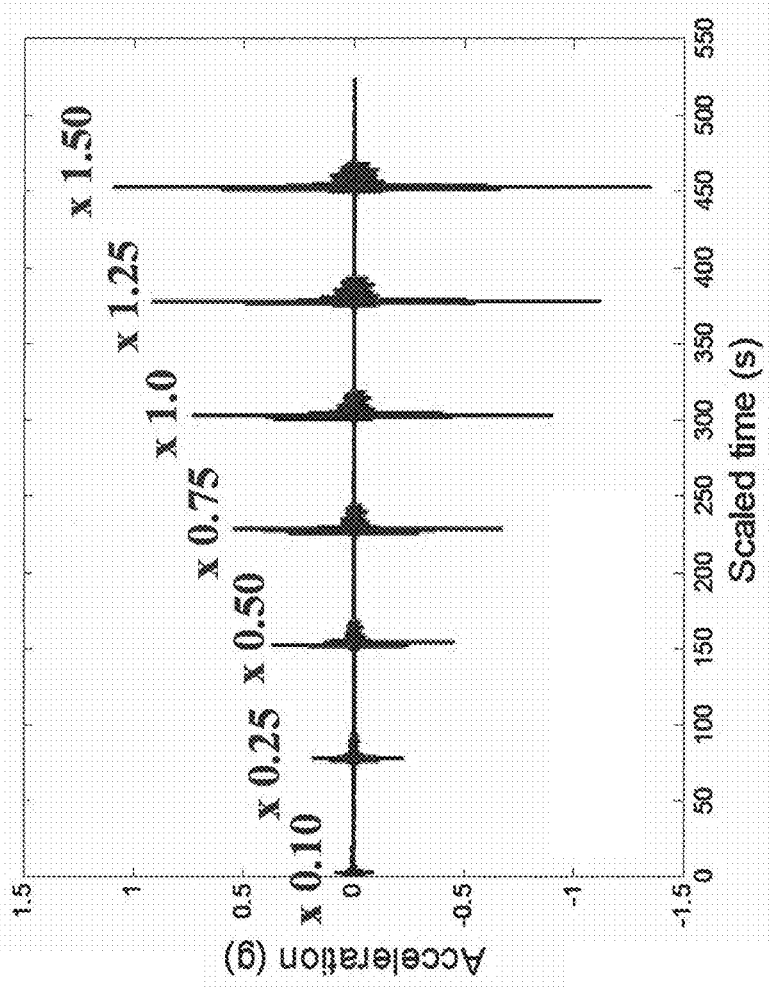
FIG. 12 illustrates acceleration data used in analytical modeling of support column structures.
Figure 13:
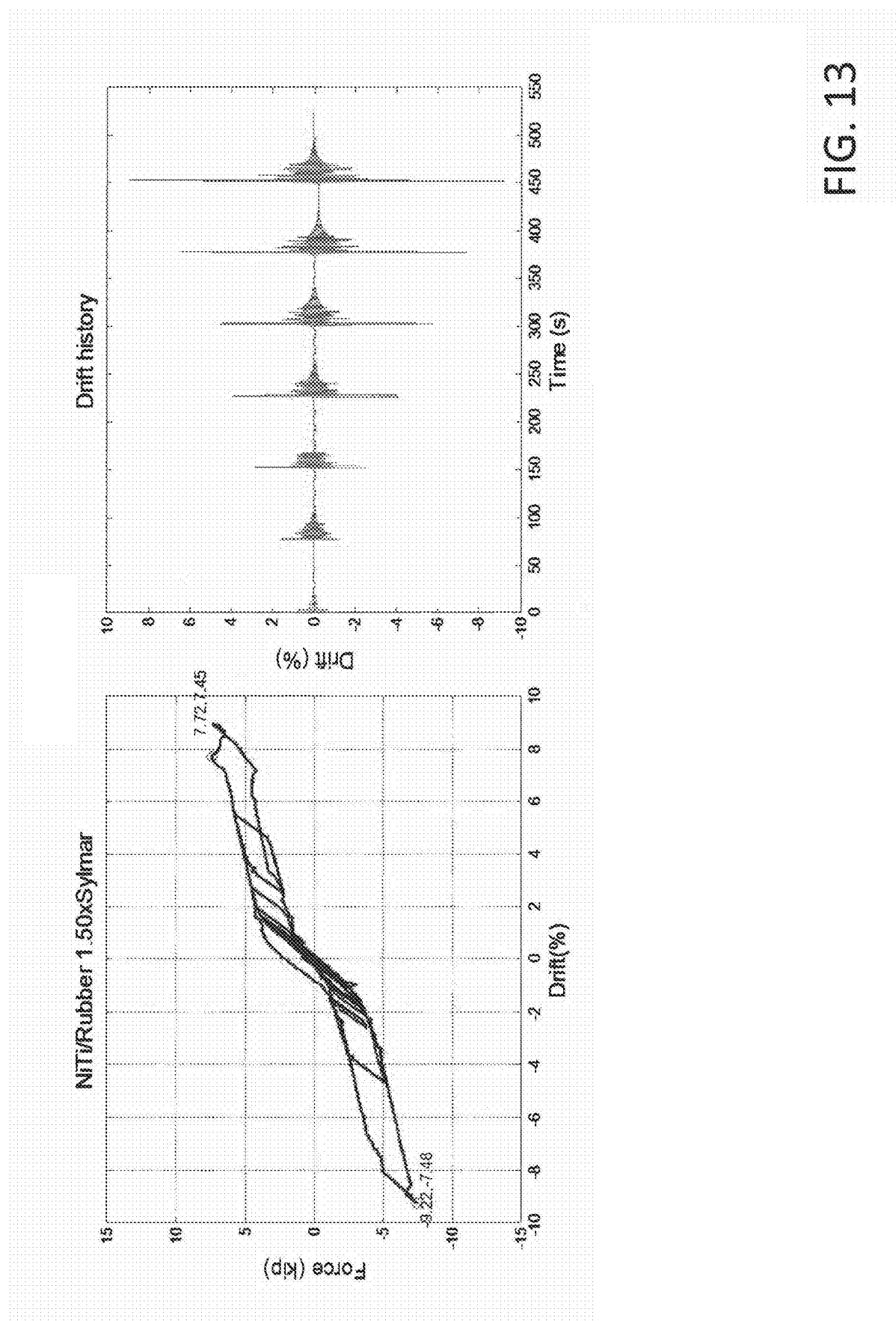
FIGS. 13-15 illustrate the results of analytical modeling of support column structures.
Figure 14:
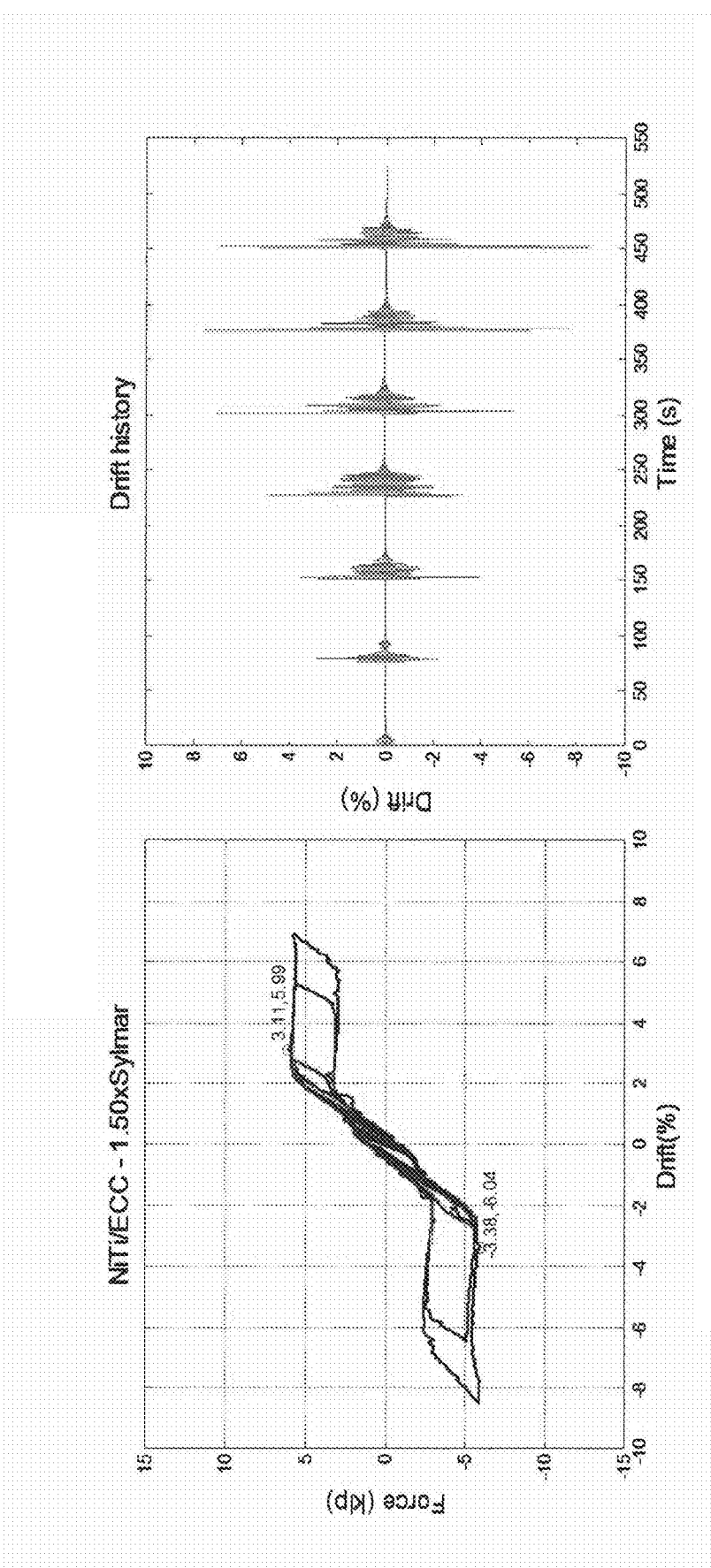
Figure 15:
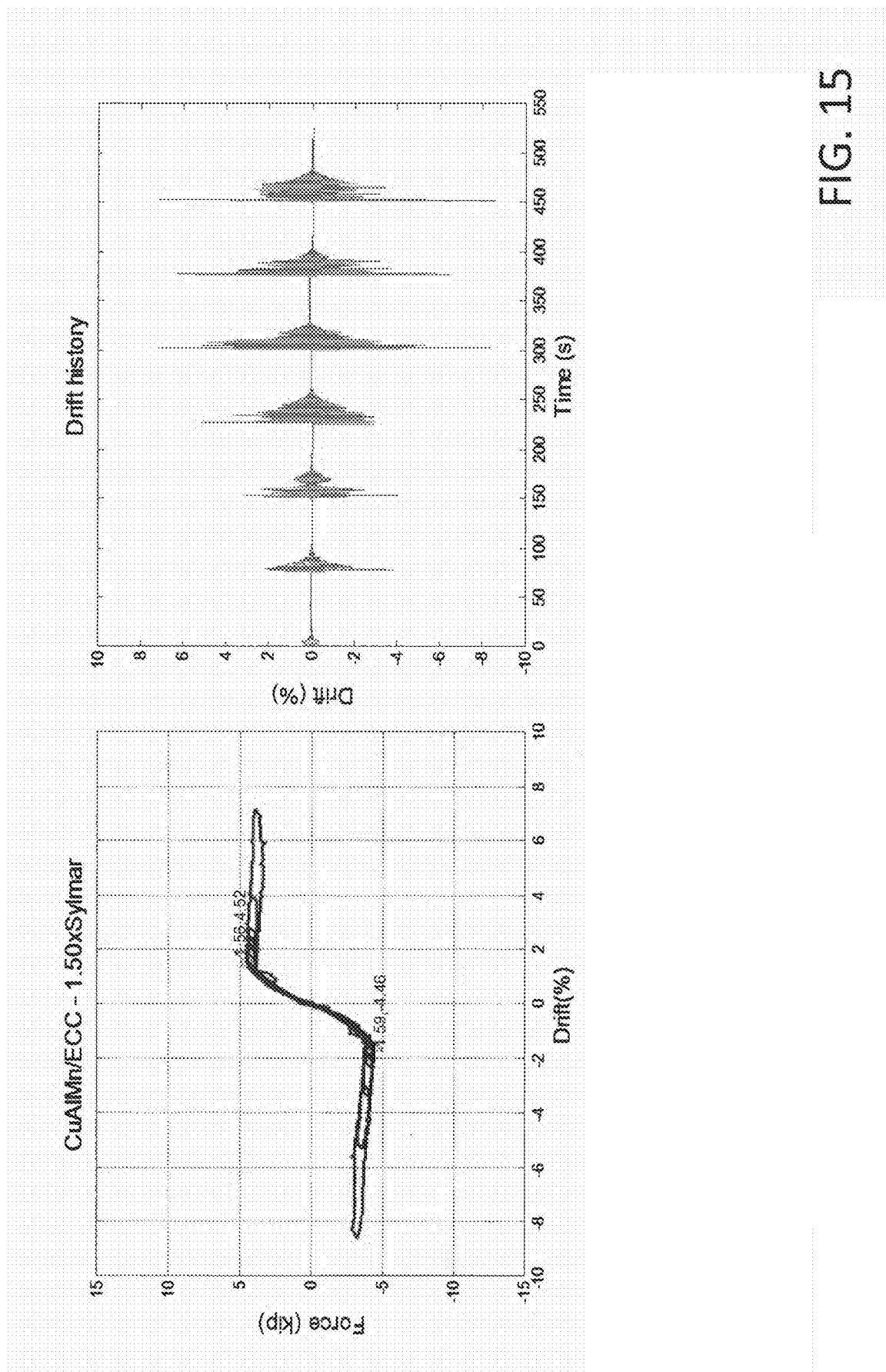

Analytical modeling of the structure 100 including various components was performed to assess the performance of the structure 100 and the various components described above in response to an earthquake represented by the input acceleration data illustrated in FIG. 12. The input acceleration data shown in FIG. 12 and used in the analytical modeling is based on the 142 Sylmar converter station record and is scaled with a time-compression factor of 0.5. FIG. 13 illustrates the results of the analytical modeling of structure 100 including removable element 104A and SMA bars 106A. FIG. 14 illustrates the results of the analytical modeling of structure 100 including removable element 104B and SMA bars 106A. FIG. 15 illustrates the results of the analytical modeling of structure 100 including removable element 104B and SMA bars 106B.

A method of assembling the structure 100 can include fabricating the base portion 102, fabricating the removable element 104, fabricating the column portion 108, and fabricating the head portion 110. The method can further include threading the SMA bars 106 into the coupling elements 112 and situating the removable element 104 on the base portion 102 such that the SMA bars 106 extend through the removable element 104. The method can further include coupling the SMA bars 106 to the removable element 104 using the fasteners 146. The method can further include situating the column portion 108 and the head portion 110 on the removable element 104 such that the reinforcing elements 130 extend through the openings 148 in the top plate 116 of the removable element 104. The method can further include coupling the reinforcing elements 130, and thereby the column portion 108, to the removable element 104 using the fasteners 136. A bridge, building, or other structure can then be built on top of and/or supported by the structure 100.

A method of disassembling the structure 100 can include lifting any bridge, building, or other structure supported by the structure 100 off of the structure 100. The fasteners 136 can be removed from the structure 100 to decouple the column portion 108 and the head portion 110 from the removable element 104, and the column portion 108 and the head portion 110 can then be removed from the removable element 104. The fasteners 146 can then be removed from the structure 100 to decouple the removable element 104 from the SMA bars 106. The removable element 104 and/or the SMA bars 106 can then be removed from the base portion 102.

An alternative method of disassembling the structure 100 can include removing the fasteners 136 from the structure 100 to decouple the column portion 108 and the head portion 110 from the removable element 104. The column portion 108 and the head portion 110 can then be lifted (e.g., along with any bridge, building, or other structure supported by the structure 100) off of the removable element 104. The fasteners 146 can then be removed from the structure 100 to decouple the removable element 104 from the SMA bars 106. The removable element 104 and/or the SMA bars 106 can then be removed from the base portion 102.

The removable element 104 can support the column portion 108, the head portion 110, and any other structural components supported thereby or mounted thereto against forces exerted against those components. Specifically, the removable element 104 can resist shear forces, axial (tensile and/or compressive) forces, torques, and bending moments. For example, when the bottom portion 126 of the tube 122 is fitted snugly within the recess 142 and the top portion 124 of the tube 122 is fitted snugly within the recess 152, the tube 122 can resist shear forces exerted against the column portion 108 and/or the head portion 110 with respect to the base portion 102, such as might be caused by an earthquake or wind.

As another example, compressive forces can be transferred from the column portion 108 through the top plate 116, the main body 120, and the bottom plate 118 to the base portion 102. Because a space is disposed between the top portion 124 of the central tube 122 and the top of the recess 152, and because the space 168 is disposed between the bottom portion 126 of the central tube 122 and the bottom of the recess 142, the central tube 122 does not carry compression or transfer compression forces from the column portion 108 to the base portion 102. It has been found that in some cases, ECC performs better than elastomeric materials in compression (e.g., ECC can exhibit higher compressive strengths than some elastomeric materials) and thus in some cases, removable element 104B can be preferable to removable element 104A.

Further, tensile forces caused by uplift on the column portion 108 and/or the head portion 110 can be transferred from the column portion 108 through the reinforcing elements 130, the top plate 116, the SMA bars 106, and the coupling elements 112 to the base portion 102, for example, via the reinforcing elements 144. Similarly, bending moments can be resisted by the selective transfer of tensile forces through some of the SMA bars 106 and the selective transfer of compression through certain portions of the main body 120, e.g., wherein the transfer of tensile forces occurs in a portion of the removable element 104 opposite a portion of the removable element 104 through which compression is transferred.

When a structure such as structure 100 includes the removable element 104, forces exerted against the structure (resulting, for example, from wind, earthquakes, impacts, etc.) can be concentrated at the removable element 104. For example, in cases where the main body 120 of the removable element 104 comprises a relatively ductile material such as an elastomeric material or an ECC, the main body 120 can act as a sacrificial portion or weak portion of the structure and forces and the associated energy exerted against the structure can be absorbed by the main body 120, resulting in plastic deformations of the main body 120. Thus, damage to the structure from unexpected and extreme loading events can be concentrated at the removable element 104, while the forces experienced by the rest of the structure can be relatively low and within the designed safety factor for those components. Because the removable element 104 is removable, its inclusion in the structure can thus make repairing the structure much more efficient.

Figure 23:
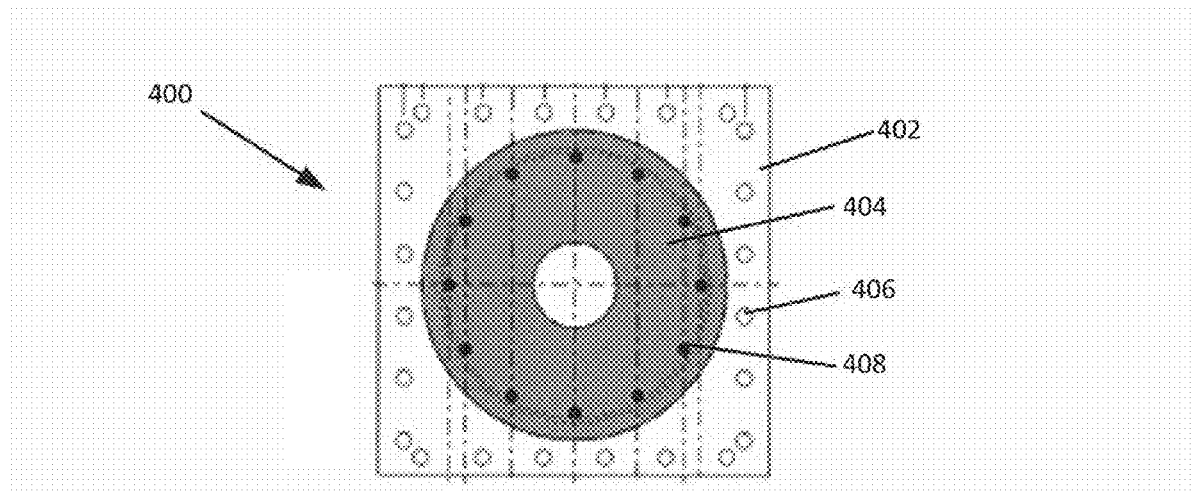
FIG. 23 is a cross-sectional view of a removable element of a support column structure, according to another embodiment.
Figure 24:
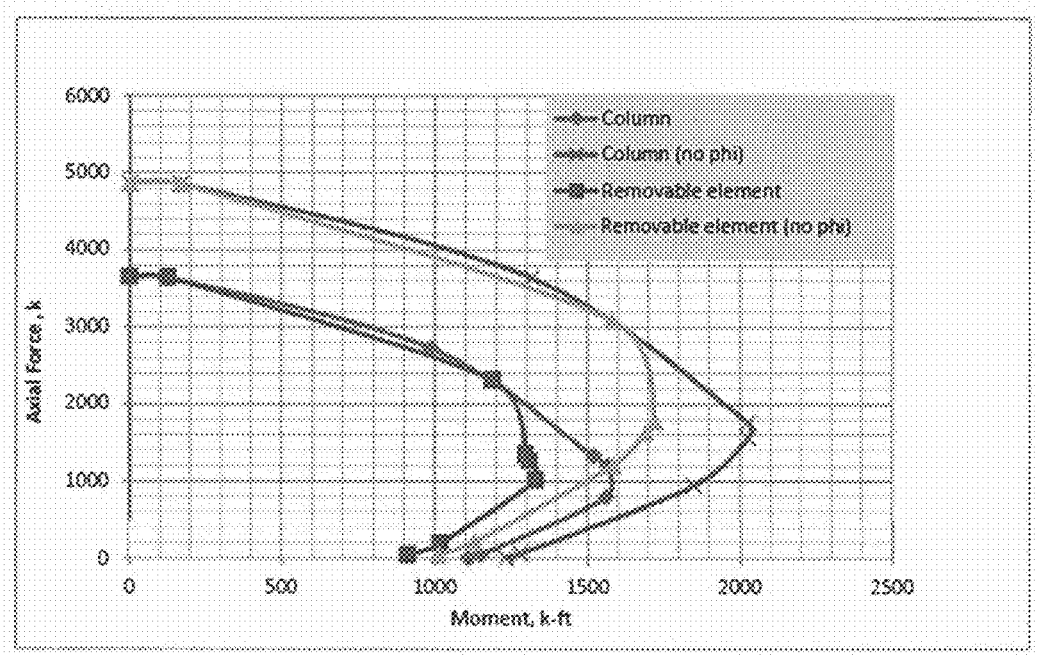
FIG. 24 illustrates additional details of the removable element of FIG. 23 compared to an ordinary column.

The sacrificial characteristic of a removable element, such as removable element 104, is further described below with respect to removable element 404 (FIGS. 23-24).

In some cases, the removable element 104 can absorb the energy imparted to a structure by an extreme loading event. For example, in cases where the main body 120 of the removable element 104 comprises a relatively ductile material such as an elastomeric material or an ECC, the main body 120 can absorb energy by undergoing extreme deformations in response to compression forces applied to the removable element 104. As another example, the SMA bars 106 can absorb energy by undergoing extreme deformations in response to tension forces applied to the removable element 104. Further, the main body 120 and the SMA bars 106 can absorb energy by undergoing corresponding extreme deformations in response to moments applied to the removable element 104.

Figure 16:
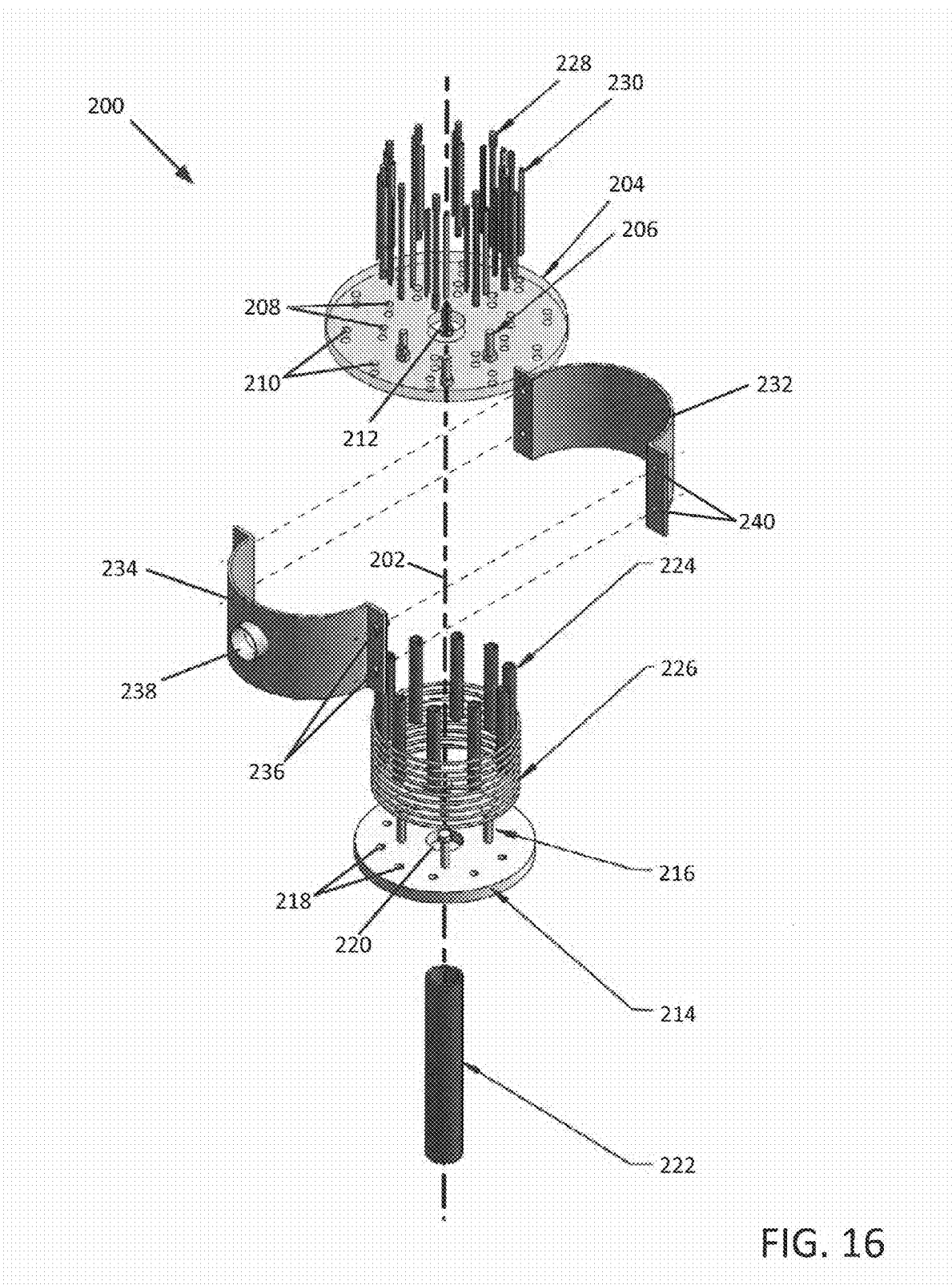
FIG. 16 is an exploded perspective view of several components of a removable element which can be used in the support column structure of FIG. 1.

FIG. 16 illustrates an exploded view of components of another removable element 200 which illustrates an alternative arrangement of removable element 104B and can be used in structure 100, e.g., in place of removable element 104, aligned along a central longitudinal axis 202 of the removable element 200. Removable element 200 comprises a top plate 204 which includes a plurality of securing elements 206 coupled to the underside of the top plate 204, a plurality of inner openings 208 configured to receive respective SMA bars 228, a plurality of outer openings 210 configured to receive reinforcing elements such as reinforcing elements 230, and a central opening 212 configured to receive a central tube 222. Removable element 200 also comprises a bottom plate 214 which includes a plurality of securing elements 216 coupled to the top side of the bottom plate 214, a plurality of inner openings 218 configured to receive the respective SMA bars 228, and a central opening 220 configured to receive the central tube 222.

The removable element 200 also includes a plurality of bar-tubes or sleeves 224 configured to receive the respective SMA bars 228, and a reinforcing element 226 having a hoop-shape configured to form a helix around the sleeves 224. The removable element 200 also includes a plurality of shim elements 230 configured such that respective pairs of the shim elements 230 can be situated inside of the respective sleeves 224 on each side of the SMA bars 228 between the SMA bars 228 and the interior wall of the sleeves 224 to prevent buckling of the SMA bars 228. The removable element 200 also includes an ECC material 242, which can bind the other components of the removable element 200 to one another (the ECC material 242 is not illustrated in FIG. 16, see FIG. 20). The ECC material 242 can have a 28-day compression strength of 6000 psi.

First and second form members 232, 234 can be provided to facilitate the forming of the ECC material 242 of the removable element 200. Each form member 232, 234 can have a shape comprising a semi-circle with flanges or extensions extending from both ends of the semi-circle. Each of the four extensions can, for example, have two openings 240, and a set of four bolts 236 can extend through the openings 240 to secure the two form members 232, 234 to one another to form a single cylindrical form element. At least one of the form members 234 can include a port 238 to which a source of an ECC material can be coupled to fill the form with the ECC material.

Figure 17:
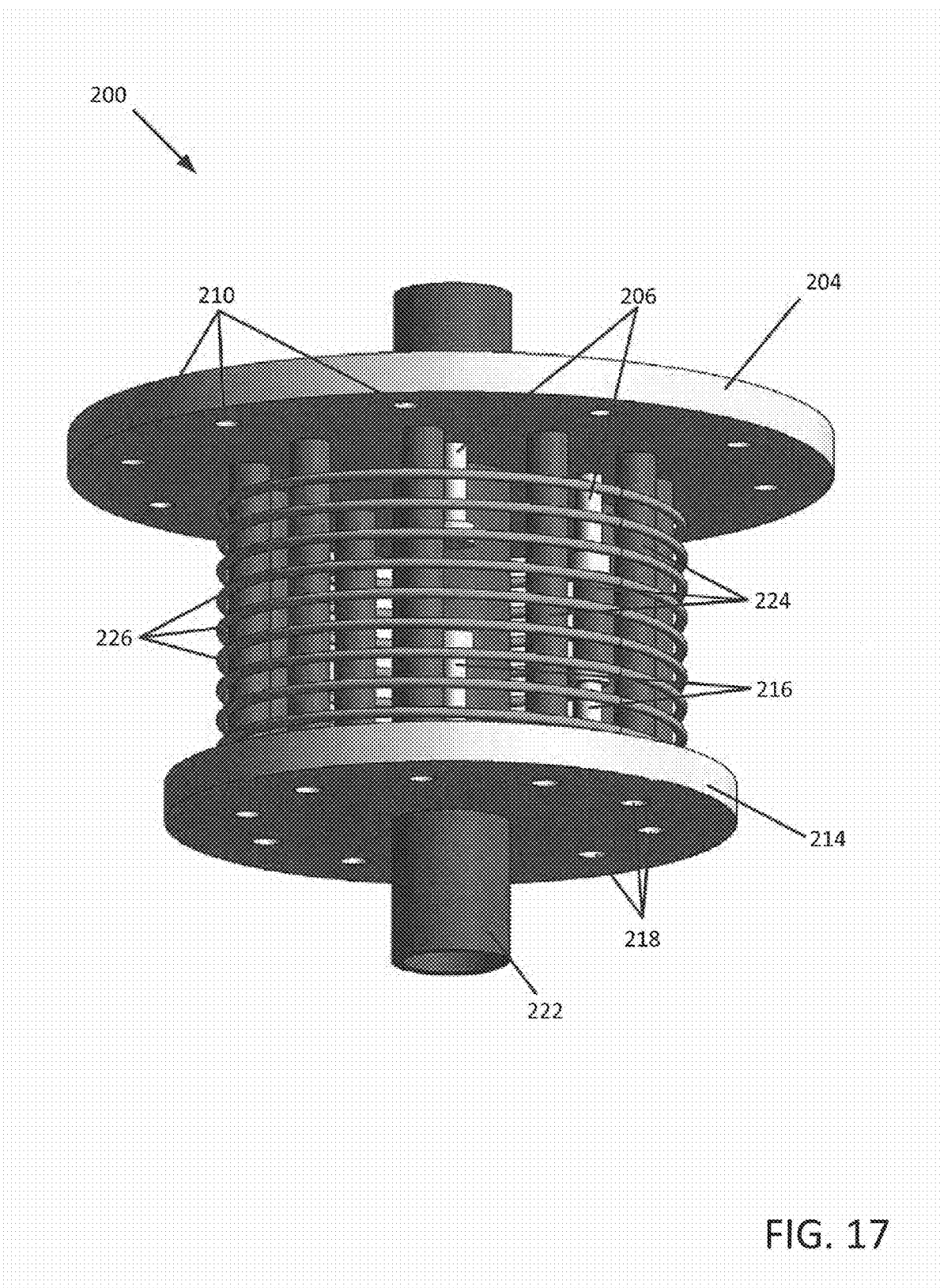
FIG. 17 is a perspective view of components of the removable element of FIG. 16 in an assembled configuration.
Figure 18:
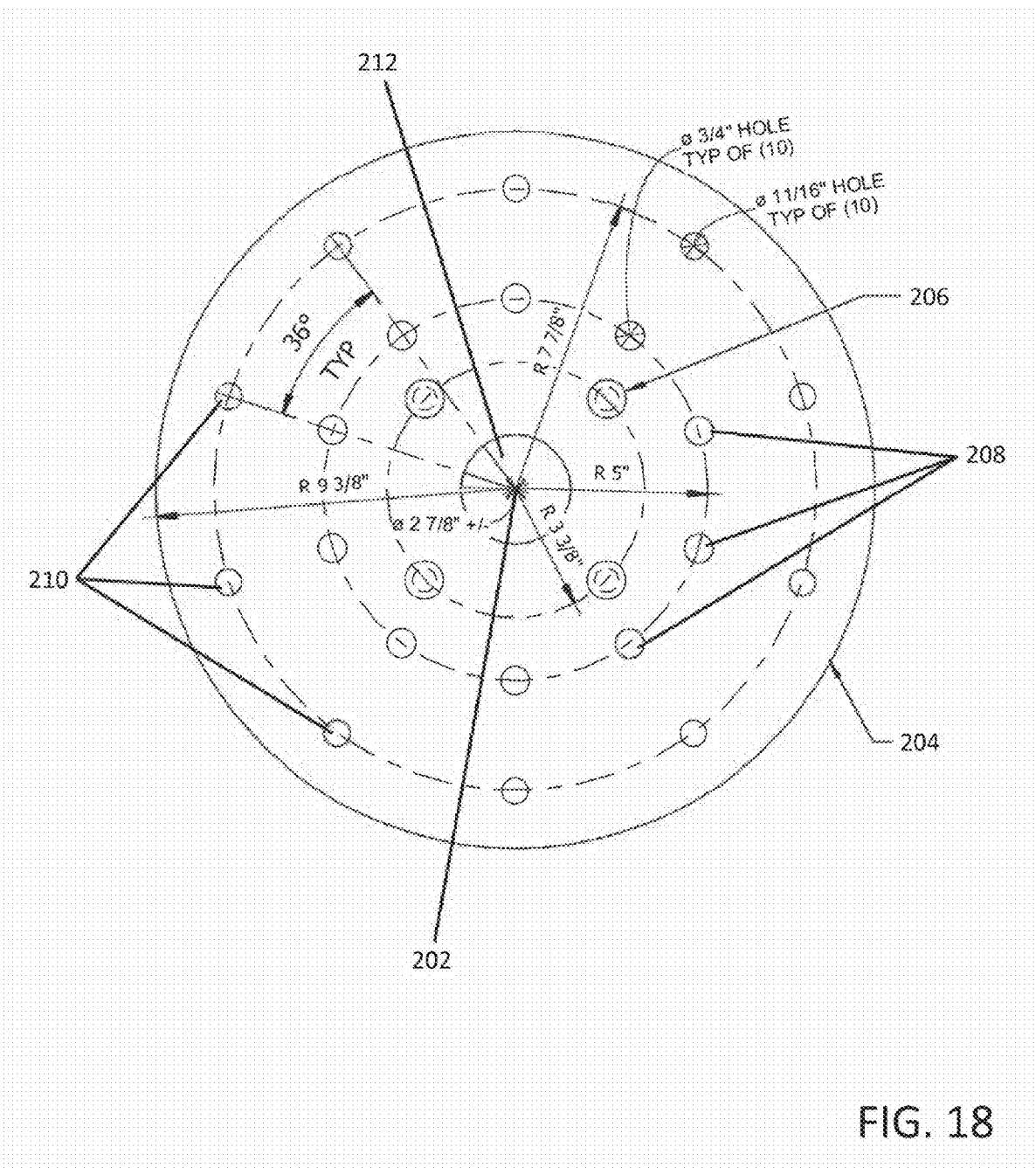
FIGS. 18-21 illustrate additional details of components of the removable element of FIG. 16.

FIG. 17 shows the removable element 200 in an assembled configuration. As in FIG. 16, the ECC material 242 is not illustrated in FIG. 17. FIG. 18 illustrates additional details of the top plate 204. For example, the top plate 204 can include four securing elements 206, each located on a circle centered on the central longitudinal axis 202 and having a radius of 3⅜". The securing elements 206 can be equally spaced apart from one another circumferentially around the central longitudinal axis 202, such as by about 90°. As another example, the top plate 204 can include ten inner openings 208, each located on a circle centered on the central longitudinal axis 202 and having a radius of 5". The inner openings 208 can be equally spaced apart from one another circumferentially around the central longitudinal axis 202, such as by about 36°. The inner openings 208 can each have a diameter of about ¾".

As another example, the top plate 204 can include ten outer openings 210, each located on a circle centered on the central longitudinal axis 202 and having a radius of 7⅞". The outer openings 210 can be equally spaced apart from one another circumferentially around the central longitudinal axis 202, such as by about 36°. The outer openings 210 can each have a diameter of about 11/16". The top plate 204 can have an overall radius of about 9⅜", and the central opening 212 can have a diameter of about 2⅞".

Figure 19:
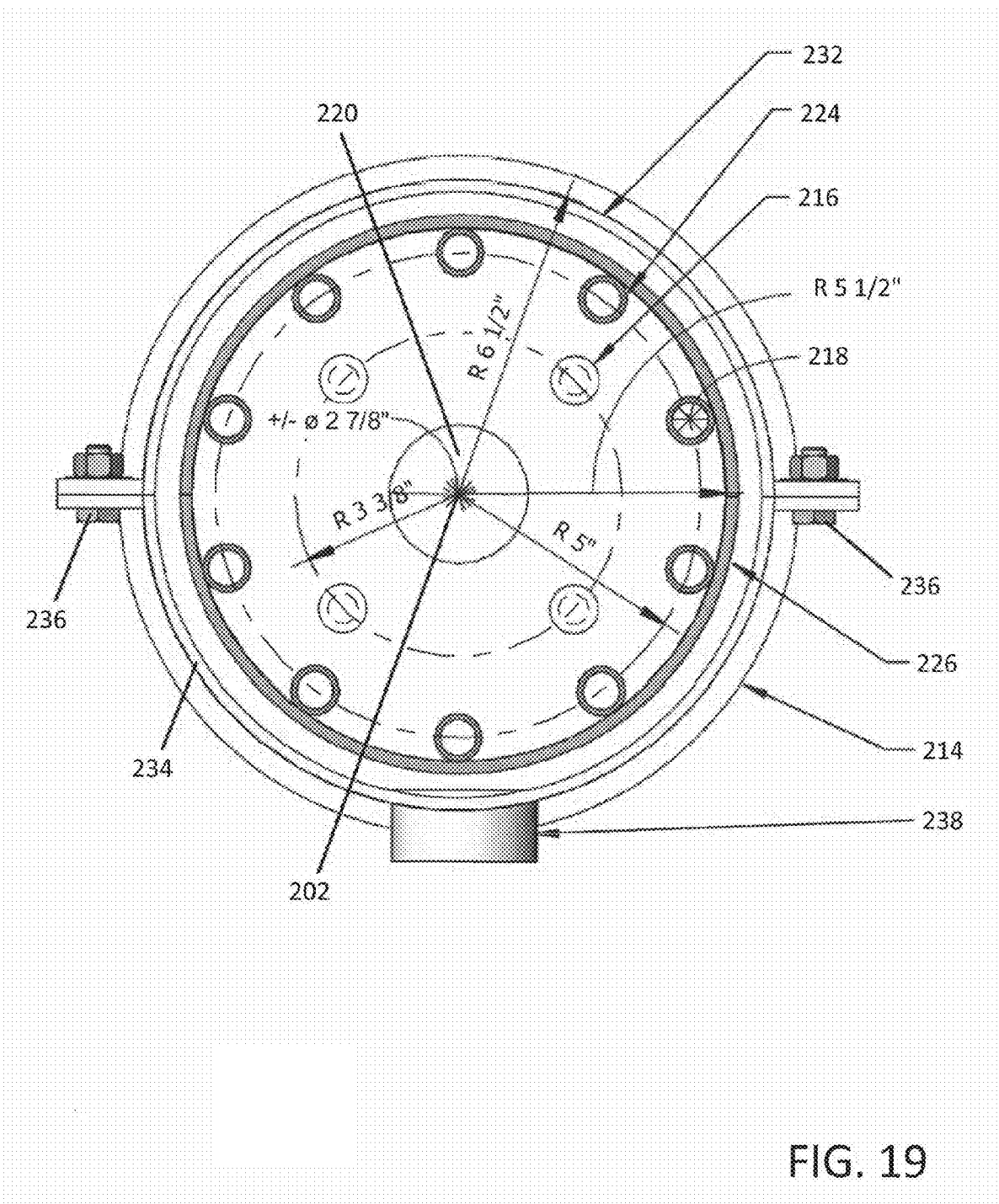

FIG. 19 illustrates additional details of the bottom plate 214 and other components of the removable element 200. For example, the bottom plate 214 can include four securing elements 216, each located on a circle centered on the central longitudinal axis 202 and having a radius of 3⅜". The securing elements 216 can be equally spaced apart from one another circumferentially around the central longitudinal axis 202, such as by about 90°. As another example, the bottom plate 214 can include ten inner openings 218, each located on a circle centered on the central longitudinal axis 202 and having a radius of 5". The inner openings 218 can be equally spaced apart from one another circumferentially around the central longitudinal axis 202, such as by about 36°. The inner openings 218 can each have a diameter of about ¾".

The bottom plate 214 can have an overall diameter of about 14" and the central opening 220 can have a diameter of about 2⅞". The cylindrical form element comprising the first and second form members 232, 234 can be centered on the central longitudinal axis 202 and have a radius (as measured to the outside surface of the form element) of 6½". The first and second form members 232, 234 can comprise an ASTM A36 steel material having a thickness of ¼". The port 238 of the form member 234 can have a 1½" inside diameter.

Figure 20:
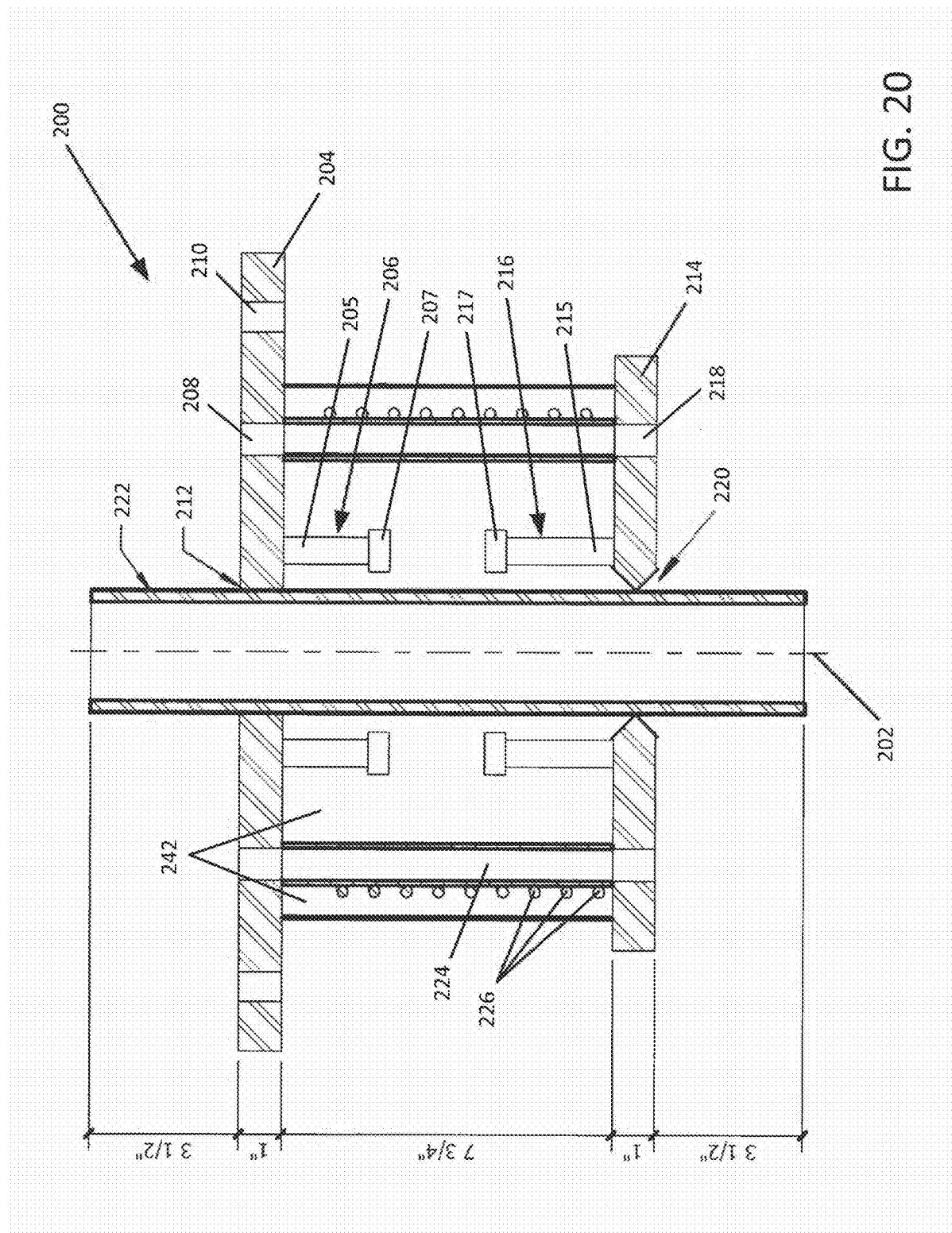

FIG. 20 illustrates a cross-sectional side view of the removable element 200, and provides examples of suitable dimensions of some of the components thereof. For example, the top plate 204 and the bottom plate 214 can each have a thickness of 1.0", and the top and bottom plates 204, 214 can be separated by a distance of 7¾" (i.e., the ECC material 242 can have a height of 7¾"). The central tube 222 can extend beyond an upper surface of the top plate 204 by 3½", and the central tube can extend beyond a lower surface of the bottom plate 214 by 3-½" (i.e., the central tube 222 can have an overall length of 16¾").

The securing elements 206, 216 can comprise elongate main body portions 205, 215 and head portions 207, 217, respectively. The securing elements 206, 216 can be ⅝"× 2½" NSA studs, can comprise ASTM A496 steel, and can be fusion welded or fillet welded to the respective plates 204, 214. The sleeves 224 can comprise cardboard sleeves having an inside diameter of ¾" and an outside diameter of 1". The reinforcing element 226 can comprise a hoop of a reinforcing material having a ¼" diameter, and can be coiled around the sleeves 224 at a ¾" pitch. The reinforcing element 226 can form a hoop having an inside radius of 5½" (FIG. 19). In some cases, the central tube 222 can have an outside diameter of 2⅞" and an inside diameter of 2½". In some cases, the central tube 222 can comprise an ASTM A53 type E or type S steel material. The top and/or bottom plates 204, 214 can comprise masonry plates, or can comprise ASTM A572 grade 50 steel. FIG. 20 also illustrates that the central opening 220 of the bottom plate 214 can comprise fillets or chamfers such that only a very narrow portion of the bottom plate 214 contacts the central tube 222, which prevents bending of the central tube 222.

Figure 21:
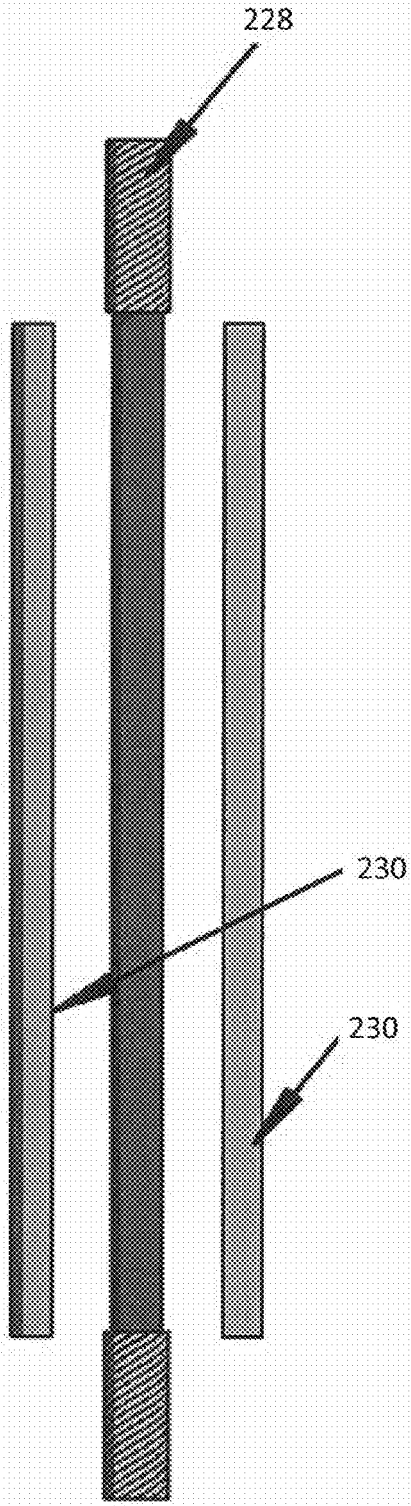

FIG. 21 illustrates an SMA bar 228 situated between two shim elements 230. The SMA bars 228 can comprise the SMA bars 106A, the SMA bars 106B, or any other suitable SMA bars. In some cases, the SMA bars 228 can comprise a Nitinol material, top and bottom end portions having a diameter of ½", and an intermediate portion between the top and bottom end portions having a diameter of 0.4". In other cases, the SMA bars 228 can comprise a Cu-SMA material, top and bottom end portions having a diameter of 9/16", and an intermediate portion between the top and bottom end portions having a diameter of 0.45". The removable element 200 can comprise any suitable number of SMA bars 228, such as one, two, three, four, five, six, eight, ten, twelve, fifteen, twenty, twenty-five, or thirty SMA bars 228. The removable element 200 can comprise two shim elements 230 for each SMA bar 228. The shim elements 230 can comprise split tube elements, wherein the split tube has an outside diameter of ⅝" and a wall thickness of 0.0109" (e.g., when using Nitinol SMA bars 228) or a wall thickness of 0.049" (e.g., when using Cu-SMA bars 228).

A method of fabricating the removable element 200 can include welding the securing elements 206, 216 to the respective plates 204, 214. The method can further include positioning the plates 204 and 214, the sleeves 224, and the reinforcing element 226 as shown in FIG. 17. The method can also include positioning the shim elements 230 within the sleeves 224 to reduce the annular space between the SMA bars 228 and the sleeves 224 which, in turn, prevents or reduces buckling in the SMA bars 228. In some cases, the sleeves 224 can be used to support the reinforcing element 226, such as by coupling the reinforcing element 226 to the sleeves 224 using a plurality of tie wires. A waterproofing material can be applied to the sleeves 224 to prevent or reduce the absorption of moisture from the ECC material into the sleeves 224. The method can further include applying a lubricant such as grease to the tube 222, and positioning the tube 222 within the other components, as shown in FIG. 17. The lubricant can help to reduce adhesion between the tube 222 and ECC 242 so as to reduce the transfer of forces between the tube 222 and the ECC 242 during operation of the removable element 200.

In some cases, the method can further include welding and/or caulking the tube 222 to plate 204 and/or plate 214. The method can further include caulking the connections between the sleeves 224 and the plates 204, 214, and clamping the plates 204, 214 to one another. The method can further include securing the form elements 232, 234 to one another and around the other components of the removable element 200, and supplying an ECC material into the form elements 232, 234 through the port 238. The method can further include allowing the ECC material to cure, then removing the form elements 232, 234.

Once the removable element 200 has been fabricated, the securing members 206, 216 secure the plates 204, 214 to the cured ECC, and the sleeves 224 separate the SMA bars 228 from the ECC 242 so that forces cannot be directly transferred between the SMA bars 228 and the ECC 242. Further, the sleeves 224 provide an open space around the SMA bars 228 within the ECC 242, so that the SMA bars 228 can be replaced as desired, for example, to replace a broken or damaged SMA bar 228 and/or to change the strength of the SMA bars 228 and thus the removable element 200. The sleeves 224 can comprise a cardboard material so they do not carry substantial compression forces, and so that compression experienced by the removable portion 200 is carried solely or primarily by the ECC 242.

Figure 22:
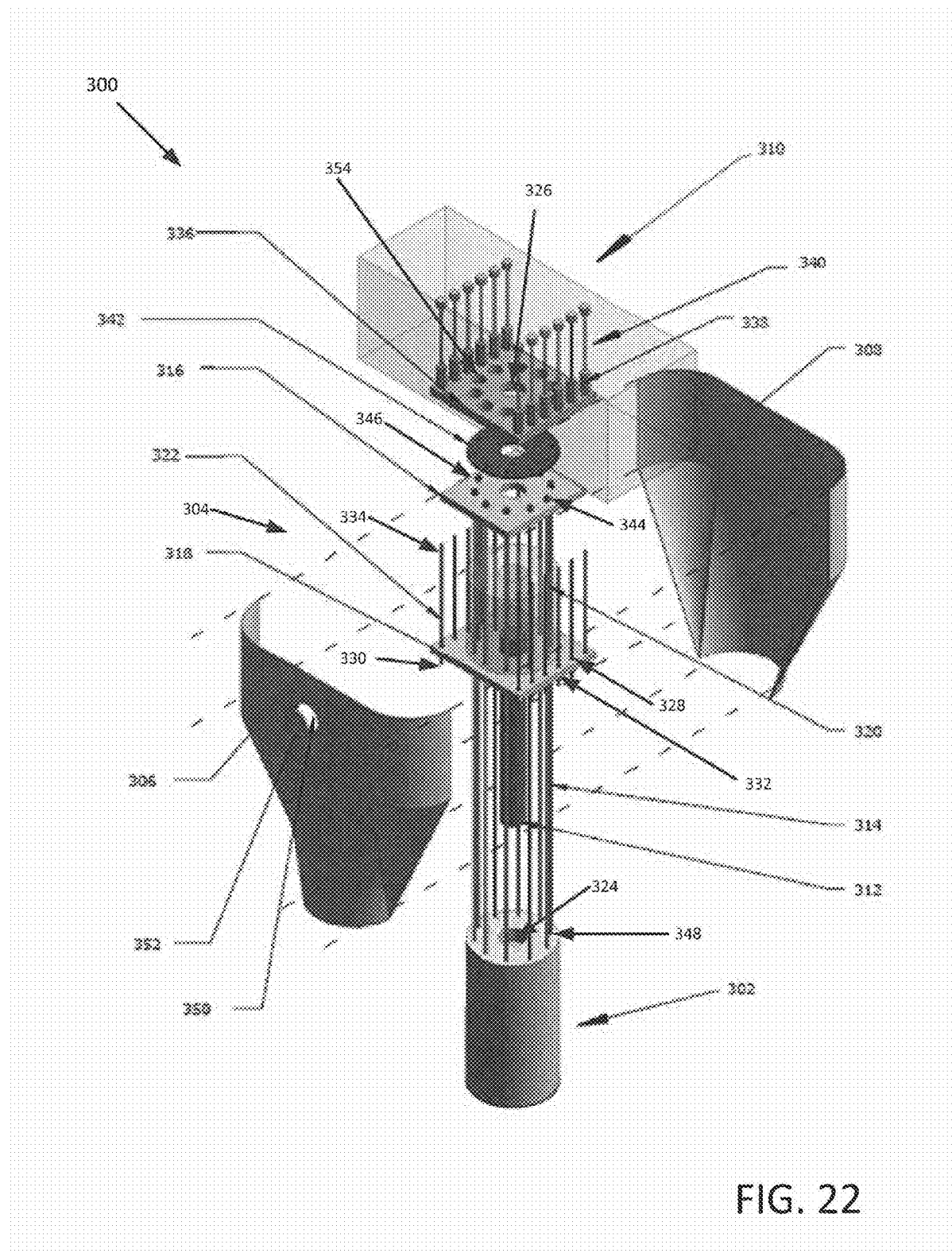
FIG. 22 is an exploded perspective view of several components of a support column structure, according to another embodiment.

FIG. 22 illustrates an exploded view of another embodiment of a support column structure 300 and, particularly, another removable element 304 which can be used in structure 300. The structure 300 includes a base portion 302, a removable element 304, a first cover member 306, a second cover member 308, a bearing pad 342, a head portion 310, and a connecting pin 312.

Base portion 302 can comprise a foundation or footing for the structure 300, and can comprise various materials, with reinforced concrete being one example. The base portion 302 can comprise a pre-cast or a cast-in-place reinforced concrete footing, and can include a plurality of reinforcing elements 314 embedded within concrete of the base 302 which extend from the base 302. The base 302 can, however, have a separate plurality of reinforcing elements (not shown in FIG. 22) connected to the lower portion 348 of the reinforcing elements 314, for example, by a coupling element (similar to coupling elements 338 further described below) or welding.

Removable element 304 can include a top plate 316, a bottom plate 318, a core 320, and a plurality of replaceable elements 322. The core 320 of the removable element 304 can comprise an ECC material. Replaceable elements 322 can comprise reinforcing bars and/or cables, including SMA bars, rebar, and/or steel cable. The top plate 316, bottom plate 318, and core 320 can include central openings (similar to the central openings 212, 220 of the top and bottom plates 204, 214, respectively) configured to receive the connecting pin 312. The base 302 and the head 310 can comprise recesses 324, 326, respectively. Thus, the connecting pin 312 can extend from the recess 324 in the base 302, through the bottom plate 318, through the core 320, through the top plate 316, and into the recess 326 of the head 310.

The top plate 316 of removable element 304 can also include a plurality of openings configured to receive the upper portions 344 of the reinforcing elements 314. In some cases, the upper portions 344 of the reinforcing elements 314 can extend through the openings in the top plate 316 and the fastening elements 346 can be fastened to the upper portions 344 of the reinforcing elements 314 so as to secure the reinforcing elements 314 to the top plate 316. In some cases, the upper portions 344 of can comprise external threads. In some cases, the fastening elements 346, which can be nuts 346, can be threaded onto the upper portions 344 of the reinforcing elements 314.

The bottom plate 318 of the removable element 304 can also include a plurality of openings 328 configured to receive bottom portions 330 of the replaceable elements 322, such that the replaceable elements 322 extend from the bottom plate 318 to the head 310 without passing through the core 320. For example, as shown in FIG. 22, the bottom plate 318 has a greater surface area than the top plate 316, such that the openings 328 are located outside of the surface area of the bottom plate 318 contacted by the core 320. Thus, the replaceable elements 322 can be independently accessible with respect to the other components of the structure 300. This can, for example, allow replaceable elements 322 to be inspected, replaced, and/or exchanged without disassembling and/or lifting the structure 300 or other components of structure 300, such as the base 302, the removable element 304, and/or the head portion 310.

In some cases, the bottom portions 330 of the replaceable elements 322 can extend through the openings 328 in the bottom plate 318 and fastening elements 332 can be fastened to the bottom portions 330 of the replaceable elements 322 so as to secure the replaceable elements 322 to the bottom plate 318. In some cases, the bottom portions 330 and top portions 334 of the replaceable elements 322 can comprise external threads. In some cases, the fastening elements 332, which can be nuts, can be threaded onto the bottom portions 330 of the replaceable elements 322 to induce tension in the replaceable elements 322 and to maintain the replaceable elements 322 in a state of tension, thereby post-tensioning the replaceable elements 322.

The openings 328 in the bottom plate 318 and the replaceable elements 322 can be configured such that the replaceable elements 322 can slide within and/or through their respective openings 328 in the bottom plate 318. Allowing the replaceable elements 322 to slide within and/or through their respective openings 328 can provide several significant advantages. For example, this configuration allows the replaceable elements 322 to be easily removed, replaced, and/or exchanged. This can be done by uncoupling the replaceable elements 322 from coupling elements 338 (further described below) and by sliding the replaceable elements 322 toward the base 302 until the top portions 334 are free from the openings 328 in the bottom plate 318.

This configuration also advantageously allows the various components of the removable element 304 to be separately optimized based on the type of load each component most suitably bears. For example, this configuration can isolate the replaceable elements 322 from compressive forces applied to the structure 300. This is because the replaceable elements 322 can slide within the openings 328 of the bottom plate 318 toward the base 302 when compression is applied to the replaceable elements 322. As a result, the compressive forces are transferred to the core 320 which is better suited to handle such forces, while the replaceable elements 322 bear tension loads because the fastening elements 332 prevent the replaceable elements 322 from sliding within the openings 328 of the bottom plate 318 toward the head portion 310. Thus, the various components of the removable element 304 (e.g., the core 320 and the replaceable elements 322) to be separately optimized based on the type of load/force each component primarily bears. For example, the pin 312 primarily bears shearing forces, the core 320 primarily bears compressive forces, and the replaceable elements primarily bears tensile forces.

A bearing pad 342 can be situated between the top plate 316 and the head 310. The bearing pad 342 can comprise various materials, neoprene being one example.

The head portion 310 can comprise a reinforced concrete block and can comprise pre-cast or cast-in-place reinforced concrete. For example, the head portion 310 can comprise a beam, girder, bent cap, or other component of the structure 300. The head portion 310 can also include an embedded plate 336 with a plurality of openings (corresponding to the plurality of openings of bottom plate 318), a recess 326, a plurality of coupling elements 338 configured to receive the top portions 334 of the replaceable elements 322, and a plurality of reinforcing elements 340.

The coupling elements 338 embedded in the head portion 310 can comprise annular members having internal threads on an interior surface of the coupling elements 338. In some cases, the portions of the reinforcing elements 340 coupled to the coupling elements 338 can have external threads complementing the internal threads of the coupling elements 338 such that the reinforcing elements 340 can be threaded into the coupling elements 338. Further, the top portions 334 of replaceable elements 322 can have external threads complementing the internal threads of the coupling elements 338 such that the replaceable elements 322 can be threaded into the coupling elements 338. Thus, the replaceable elements 322 can be coupled to the reinforcing elements 340.

The head portion 310 can comprise a plurality of recesses and the embedded plate 336 can comprise a plurality of corresponding openings, collectively forming cups 354 configured to receive the top portions 344 of the respective reinforcing elements 314 and respective nuts 346. The cups 354 can be substantially larger than the top portions 344 of the reinforcing elements 314 and the nuts 346 such that as these components move when the structure 300 is loaded in various ways, the top portions 344 of the respective reinforcing elements 314 and the nuts 346 do not contact the respective cups 354. In some cases, the cups 354 can be configured such that a gap of at least 1 mm, or at least 2 mm, or at least 5 mm, or at least 10 mm, or at least 20 mm, or at least 50 mm exists between the cups 354 and the respective top portions 344 of the reinforcing elements 314 and the nuts 346.

First and second cover members 306, 308 can be provided to protect the replaceable elements 322 and other components of the removable element 304. For example, the covers 306, 308 can provide environmental protection from materials such as water or dirt from contacting the replaceable elements 322. The cover members 306, 308 can be non-structural, thus allowing covers 306, 308 to be removed without altering the structural integrity of the structure 300. Removing the covers 306, 308 provides access to inspect or replace the replaceable elements 322 or other components of removable element 304. The cover member 306 can include a port 350. For example, the port 350 can accommodate inspection of replaceable elements 322 or other components of removable element 306 without removing the covers 306, 308. The cover member 306 can also include a port cover 352 which corresponds to port 350. One or both cover members can include a port and port cover. Additionally, the covers 306, 308 can provide space between the covers 306, 308 and removable element 304. For example, this space can be used for instrumentation for structure monitoring, signage, lighting, etc.

The covers 306, 308 can formed from various materials. For example, the covers 306, 308 can be formed from fiberglass or glass fiber reinforced concrete ("GFRC"). The covers 306, 308 also advantageously allow the architectural appearance of the column support structure to be separate from the structural components of the column support structure. For example, the non-structural covers 306, 308 can be formed so as to give the structure 300 the appearance of a "flared" column but structural components can be formed so as to provide improved seismic performance compared to a structure with structural components forming "flared" column.

As mentioned above with respect to the removable element 104, a removable element such as the removable element 104, 200, or 304 can act as a sacrificial or weak link that can be replaced relatively easily while preserving the structural integrity of the rest of the structure. For example, FIG. 23 shows a cross section of a removable element 400 (similar to removable element 304) which can be used with a support column structure (e.g., support column structure 300).

The removable element 400 can comprise a bottom plate 402, a core 404, replaceable elements 406, and reinforcing elements 408. The core 404 can be formed from an ECC material and can have a 36" outside diameter. The replaceable elements 406 can comprise twenty-four SMA (e.g., Nitinol) rods each having a diameter of 7/8", which are distributed uniformly around the bottom plate 402 outside of the core 404. The reinforcing elements can comprise twelve rebar rods each having a diameter of 1 3/8", which are distributed uniformly around the core 404.

FIG. 24 shows a load-moment ("P-M") interaction diagram comparing the removable element to a typical concrete column both with and without a phi factor. The strength limit curve shows that axial performance of the removable element 400 at minimal moment is the same as the ordinary column. In fact the removable element 400 limit matches the ordinary column very closely until near the balanced condition. The same phi factor is used for both the removable element 400 and the ordinary column. The corresponding curves without any phi factor are shown for comparison. As shown, the removable element 400 yields before the ordinary column. Although not shown, the compression-only portions of the curves are identical as the replaceable elements 406 are inactive during compression.

Because the modulus of the replaceable elements 406 is low, the strain associated with the removable element 400 is larger for any given moment that develops tension in the replaceable elements 406. Thus the rotational stiffness of the removable element 400 is considerably less once the replaceable elements 406 are placed in tension. For example, the rotational $K_{eff}$ (linear stiffness to first yield of the replaceable elements 406) for the removable element 400 is approximately $139.5 \times 10^3$ k-ft/rad. For comparison, the section rotational $K_{eff}$ for the ordinary column is $979.6 \times 10^3$ k-ft/rad (neglecting the length of the column.) The lower rotational stiffness of the removable element 400 should, in most applications (e.g., a bridge) and locations, reduce seismic demand by lengthening the period of the structure. Thus, the removable element 400, unlike other isolation-type systems, does not affect the vertical stiffness or strength of the column's assembly because it only "activates" once sufficient moment has been generated to place the replaceable elements 406 in tension.

A removable element, such as the removable element 104, 200, 304 or 400, can separate a structure from its foundation, such that forces applied to the structure are transferred to the foundation through the removable element.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A support column structure, comprising:
a base portion;
a column portion having a plurality of first reinforcing bars extending from the column portion;
a removable portion disposed between the base portion and the column portion and comprising a main body portion, a first plate, and a second plate, the main body portion disposed between the first and second plates, the first plate comprising a plurality of first openings and a plurality of second openings spaced from the first openings, the second plate comprising a plurality of third openings aligned with the second openings of the first plate; and
a plurality of second reinforcing bars,
wherein the first reinforcing bars extend through respective ones of the first openings of the first plate and removably couple the removable portion to the column portion, and the first reinforcing bars are spaced from the base portion, and
wherein the second reinforcing bars extend through respective ones of the second openings of the first plate, extend through respective ones of the third openings of the second plate, and removably couple the removable portion to the base portion, and the second reinforcing bars are spaced from the column portion.

2. The support column structure of claim 1, wherein:
the removable portion further comprises a plurality of sleeves extending from the first plate to the second plate, and the sleeves receive respective ones of the second reinforcing bars and separate the second reinforcing bars from the main body portion of the removable portion such that the second reinforcing bars are not in contact with the main body portion of the removable portion, wherein the sleeves comprise a cardboard material such that the sleeves transfer compressive forces to the main body portion,
the column portion comprises a plurality of first recesses, and
the second reinforcing bars are disposed within respective ones of the first recesses of the column portion and are not in contact with the column portion surrounding the first recesses.

3. The support column structure of claim 2, further comprising a plurality of shim elements, and at least one of the shim elements is disposed radially between each of the second reinforcing bars and the respective sleeve.

4. The support column structure of claim 1, wherein a plurality of first nuts is situated on respective first end portions of each of the first reinforcing bars, thereby removably coupling the removable portion to the column portion, and a plurality of second nuts is situated on respective second end portions of each of the second reinforcing bars, thereby removably coupling the removable portion to the base portion.

5. The support column structure of claim 2, wherein the column portion comprises a central, second recess, the base portion comprises a central, third recess, and the removable portion further comprises a central longitudinal pipe extending from the second recess of the column portion, through the first plate, through the main body portion, through second plate, and to the third recess of the base portion, wherein the pipe is spaced from the an end surface of the third recess such that the pipe can resist relative shear forces between the base portion and the removable portion and such that the removable portion can transfer compressive forces on the column portion from the column portion to the base portion.

6. The support column structure of claim 1, wherein the second reinforcing bars comprise a shape memory alloy.

7. A method of assembling the support column structure of claim 1, comprising:
positioning the base portion to act as a foundation for the support column structure;
coupling the second reinforcing bars to the base portion;

situating the removable portion on the base portion such that the second reinforcing bars extend through the main body portion of the removable portion;

coupling the second reinforcing bars to the removable portion such that the removable portion is restrained against movement with respect to the base portion;

situating the column portion on the removable portion; and coupling the column portion to the removable portion with the first reinforcing bars such that the column portion is restrained against movement with respect to the removable portion.

8. The method of claim 7, wherein the second reinforcing bars comprise a shape memory alloy.

9. The method of claim 7, wherein coupling the second reinforcing bars to the base portion comprises threading each of the reinforcing bars into a respective coupling element of the base portion.

10. The method of claim 7, wherein coupling the second reinforcing bars to the removable portion comprises threading a nut onto a first end portion of each of the second reinforcing bars.

11. The method of claim 7, wherein:

situating the column portion on the removable portion comprises inserting the first reinforcement bars of the column portion through respective ones of the first openings of the removable portion; and coupling the column portion to the removable portion comprises threading a nut onto a first end portion of each of the first reinforcement bars of the column portion.

12. The support column structure of claim 1, wherein the main body portion of the removable portion comprises an engineered cementitious composite.

13. The support column structure of claim 1, wherein the main body portion of the removable portion comprises an elastomeric material.

14. A support column structure, comprising:

a reinforced concrete base portion having a top portion and a plurality of first reinforcing bars;

a reinforced concrete column portion having a bottom portion and a plurality of second reinforcing bars;

a removable portion comprising a main body portion, a first plate, a second plate, and a plurality of sleeves, wherein the main body portion and the sleeves are disposed axially between the first and second plates; and a plurality of third reinforcing bars, wherein each of the second reinforcing bars of the column portion extends from the bottom portion of the column portion and is removably coupled to the first plate of the removable portion, wherein each of the third reinforcing bars extends through the first plate of the removable portion, through a respective sleeve of the removable portion, through the second plate of the removable portion, to the top portion of the base portion, and each of the third reinforcing bars is removably coupled to a respective first reinforcing bar of the base portion, wherein the sleeves separate the respective third reinforcing bars from the main body portion of the removable portion such that the third reinforcing bars are not in contact with the main body portion of the removable portion, wherein the first reinforcing bars are axially aligned with the third reinforcing bars, and the first reinforcing bars are axially offset relative to the second reinforcing bars, and wherein the first and third reinforcing bars are spaced from the column portion such that the first and third reinforcing bars are not directly coupled to the column portion, and the second reinforcing bars are spaced from the base portion such that the second reinforcing bars are not directly coupled to the base portion.

15. The support column structure of claim 14, wherein the sleeves structurally separate the third reinforcing bars from the main body portion such that forces cannot be directly transferred between the third reinforcing bars and the main body portion.

16. The support column structure of claim 14, wherein the main body portion of the removable portion comprises an engineered cementitious composite having a compressive strength of 5 ksi to 9 ksi and a tensile strain capacity of 3 percent to 7 percent.

17. The support column structure of claim 14, wherein the first plate extends radially outwardly beyond the second plate, and the second reinforcing bars are disposed radially outwardly relative to the first and third reinforcing bars.

18. The support column structure of claim 14, wherein:

the base portion comprises a plurality of coupling elements situated within the top portion of the base portion and coupled to the first reinforcing bars;

each of the coupling elements has a respective annular top portion having inner threads formed therein;

each of the third reinforcing bars comprises a respective bottom portion having outer threads formed therein; and the bottom portion of each of the third reinforcing bars is threaded into a respective one of the coupling elements.

19. The support column structure of claim 14, wherein the main body portion of the removable portion comprises an elastomeric material.

\* \* \* \* \*